(12) United States Patent  
Liang et al.

(10) Patent No.: US 7,539,153 B1
(45) Date of Patent: May 26, 2009

(54) METHOD AND APPARATUS FOR LONGEST PREFIX MATCHING BASED ON A TRIE

(75) Inventors: Jun Liang, Shenzhen (CN); Shijun Shen, Shenzhen (CN); Meng Li, Shenzhen (CN); Juan Zhang, Shenzhen (CN); Rui Hu, Shenzhen (CN); Jun Gong, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 12/241,513

(22) Filed: Sep. 30, 2008

(30) Foreign Application Priority Data

May 5, 2008 (CN) .................... 2008 1 0096906

(51) Int. Cl.
*G01R 31/08* (2006.01)
(52) U.S. Cl. .................... 370/255; 370/256; 370/389
(58) Field of Classification Search .................... None
See application file for complete search history.

(56) References Cited

U.S. PATENT DOCUMENTS

| 5,787,430 | A | | 7/1998 | Doeringer et al. | |
|---|---|---|---|---|---|
| 6,011,795 | A | | 1/2000 | Varghese et al. | |
| 6,041,053 | A | * | 3/2000 | Douceur et al. | 370/389 |
| 6,396,842 | B1 | * | 5/2002 | Rochberger | 370/408 |
| 6,691,171 | B1 | | 2/2004 | Liao | |
| 6,697,363 | B1 | | 2/2004 | Carr | |

(Continued)

FOREIGN PATENT DOCUMENTS

EP  1063827  12/2000

(Continued)

OTHER PUBLICATIONS

Haoyu Hong et al., Shape Shifting Tries for Faster IP Route Lookup, http://www.ieee-icnp.org/2005/Papers/32_hsong-sst.pdf, Published by IEEE, date 2005, pp. 1-10.

(Continued)

*Primary Examiner*—Robert W Wilson
(74) *Attorney, Agent, or Firm*—Morris Manning Martin LLP; Tim Tingkang Xia, Esq.

(57) ABSTRACT

The present invention discloses a method and apparatus for longest prefix matching. The method includes (A) reading a current-level trie node (TNODE) in the trie, (B) determining whether an offset field of the TNODE indicates that a matched prefix exists in an upper level node and, if so, adding the offset field of the TNODE to a pointer that points to a leaf array in the upper level node, updating a current best match pointer with the computation result and executing block (C), otherwise, executing block (C), (C) determining whether the TNODE has a child node according to a child bitmap, when it is determined that a branch flag of the TNODE matches a corresponding bit of a search keyword, and (D) when it is determined that the TNODE has no child node, reading the internal bitmap of the TNODE, computing a longest matched prefix in the TNODE according to the internal bitmap and a pointer that points to a leaf array in the TNODE, updating the current best match pointer with the computation result, and computing an address of a leaf node (LNODE) associated with the current best match pointer.

15 Claims, 21 Drawing Sheets

U.S. PATENT DOCUMENTS

| | | |
|---|---|---|
| 6,785,687 B2 | 8/2004 | Baskins et al. |
| 6,816,856 B2 | 11/2004 | Baskins et al. |
| 6,888,838 B1 | 5/2005 | Ji et al. |
| 7,212,531 B1 | 5/2007 | Kopelman et al. |
| 7,274,697 B2 | 9/2007 | Ji et al. |
| 7,349,415 B2 | 3/2008 | Rangarajan et al. |
| 7,415,463 B2 | 8/2008 | Testa |
| 7,415,472 B2 | 8/2008 | Testa |
| 2002/0172203 A1 | 11/2002 | Ji et al. |
| 2003/0204636 A1 | 10/2003 | Greenblat et al. |
| 2004/0008634 A1 | 1/2004 | Rangarajan et al. |
| 2006/0002386 A1 | 1/2006 | Yik et al. |
| 2006/0221956 A1 | 10/2006 | Narayan et al. |
| 2006/0221967 A1 | 10/2006 | Narayan et al. |
| 2007/0091899 A1 | 4/2007 | Ward et al. |
| 2007/0121632 A1 | 5/2007 | Zabarski |
| 2008/0056262 A1 | 3/2008 | Singh |
| 2008/0133517 A1 | 6/2008 | Kapoor et al. |
| 2008/0133518 A1 | 6/2008 | Kapoor et al. |

FOREIGN PATENT DOCUMENTS

| | | |
|---|---|---|
| EP | 1168723 A2 | 1/2002 |
| EP | 1335538 | 8/2003 |
| WO | WO03005152 | 1/2003 |
| WO | WO03079618 | 9/2003 |
| WO | WO03103240 | 12/2003 |
| WO | WO2004102856 | 11/2004 |
| WO | WO2008014188 | 1/2008 |

OTHER PUBLICATIONS

Nathan Tuck et al., Deterministic Memory-Efficient String Matching Algorithms for Intrusion Detection, http://www.ieee-infocom.org/2004/Papers/54_5.PDF, Published by IEEE, date 2004, pp. 1-12.

Haoyu Hong et al., Shape Shifting Tries for Faster IP Route Lookup, http://www.ieee-icnp.org/2005/Papers/32_hsong-sst.pdf.

Nathan Tuck et al., Deterministic Memory-Efficient String Matching Algorithms for Intrusion Detection, http://www.ieee-infocom.org/2004/Papers/54_5.PDF.

* cited by examiner

METHOD AND APPARATUS FOR LONGEST PREFIX MATCHING BASED ON A TRIE

This application claims priority to Chinese patent application No. 200810096906.2, filed May 5, 2008, entitled "Method and Apparatus for Longest Prefix Matching Based on a Trie", the entire content of which is incorporated herein by reference.

FIELD OF THE INVENTION

The disclosure relates to communication and computing technologies, and more particularly, to a system and method for longest prefix matching based on a trie.

BACKGROUND

When forwarding an Internet Protocol (IP) packet, a router searches a routing table according to the destination address of the IP packet. The routing table includes multiple route prefixes. Each route prefix is represented by a string made up of 0 and 1 and other symbols, such as 01*. The asterisk "*" at the end of the string indicates that the bits in this position can be any combination of 0 and 1. Each route prefix in the routing table is associated with a next hop. When a router forwards an IP packet, the router finds a corresponding prefix in the routing tabling according to the destination address of the IP packet by performing longest prefix matching. After finding the longest prefix that matches the destination address, the router forwards the IP packet according to the next hop associated with the prefix. In longest prefix matching, if a router has two route prefixes, namely, (10*→interface 1) and (1010*→interface 2), when a packet with a destination IP address 101001 is received, the address matches both prefixes while the second prefix has more matched bits, and therefore, the second prefix is regarded as the final matching result and the router forwards the packet according to the next hop associated with that prefix.

As the network scale increases, IPv6 and virtual private network (VPN) are widely used and a routing table includes more and more prefixes. A router now needs to support up to millions of route prefixes. Moreover, the interface rate of a router increases continuously, so the speed of longest prefix matching on a router needs to increase to support 40 Gbit/s, 100 Gbit/s and higher interface rates.

Conventionally, a static random access memory (SRAM) is often employed to realize high speed search but unable to support a large-sized routing table, or a dynamic random access memory (DRAM) is employed to support a large-sized routing table but unable to realize high speed search due to a low rate of the DRAM.

In order to support a large-sized routing table as well as high speed search, a trie-based method for longest prefix matching is generally adopted, where a trie is an ordered tree data structure that is used to store lots of strings. With common prefixes of strings, the storage space can be saved. The updating process is fast and the search performance is only related to the address length while unrelated to the number of prefixes. Therefore, the use of longest prefix matching based on a trie has become popular. For example, there is a method for searching the longest matched prefix by a compressed multi-bit trie in the prior art. In the case of matching based on a compressed multi-bit trie, if the step size is r bits, only r bits can be read at a time. This search speed may not satisfy the requirement of continuously growing line rates.

Therefore, a heretofore unaddressed need exists in the art to address the aforementioned deficiencies and inadequacies.

SUMMARY OF THE INVENTION

In one aspect, the present invention relates to a method for longest prefix matching based on a trie which represents multiple prefixes, with a prefix distinguished by at least one step and each step indicated by one node. In one embodiment, the method includes: (A) reading a current-level trie node (TNODE) in the trie, (B) determining whether an offset field of the read TNODE indicates that a matched prefix exists in an upper level node and, if a matched prefix exists, adding the offset of the TNODE to a pointer that points to a leaf array in the upper level node, updating a current best match pointer and executing block C; or, if no matched prefix exists, executing block C directly, (C) determining whether the TNODE has a child node according to a child bitmap when it is determined that a branch flag of the TNODE matches a corresponding bit of a search keyword, and (D) when it is determined that the TNODE has no child node, reading an internal bitmap of the TNODE, computing a longest matched prefix in the TNODE according to the internal bitmap and a pointer that points to a leaf array in the TNODE, updating the current best match pointer with the computation result, and computing an address of a leaf node (LNODE) associated with the current best match pointer.

In another aspect, the present invention relates to a search apparatus for searching for a longest matched prefix based on a trie, where the trie represents multiple prefixes, with a prefix distinguished by at least one step and each step indicated by one node, and nodes are read from at least one memory. In one embodiment, the apparatus includes: a reading unit, adapted to read a node in the trie, a best match pointer determining unit, adapted to determine whether an offset field of the read node indicates that a matched prefix exists in an upper level node and, if a matched prefix exists, add the offset of the node to a pointer that points to a leaf array in the upper level node and update a current best match pointer, a branch flag determining unit, adapted to determine whether a branch flag of the node matches a corresponding bit of a search keyword and, if they match, trigger a child bitmap determining unit, a child bitmap determining unit, adapted to determine whether the node has a child node according to a child bitmap and, if no child node exists, trigger an internal bitmap matching unit, and an internal bitmap matching unit, adapted to read an internal bitmap of the node, compute a longest matched prefix in the node according to the internal bitmap and a pointer that points to a leaf array in the node, update the current best match pointer with the computation result, and compute an address of a LNODE associated with the current best match pointer.

In yet another aspect, the present invention relates to a computer-readable medium containing computer-executable instructions for performing a method for longest prefix matching based on a trie, wherein the trie represents multiple prefixes with a prefix distinguished by at least one step and each step indicated by one node. In one embodiment, the method comprise (A) reading a current-level trie node (TNODE) in the trie, (B) determining whether an offset field of the read TNODE indicates that a matched prefix exists in an upper level node and, if a matched prefix exists, adding the offset of the TNODE to a pointer that points to a leaf array in the upper level node, updating a current best match pointer and executing block C; or, if no matched prefix exists, executing block C directly, (C) determining whether the TNODE has a child node according to a child bitmap when it is determined that a branch flag of the TNODE matches a corresponding bit of a search keyword, and (D) when it is determined that the TNODE has no child node, reading an internal bitmap of the TNODE, computing a longest matched prefix in the TNODE according to the internal bitmap and a pointer that points to a leaf array in the TNODE, updating the current best match pointer with the computation result, and computing an address of a leaf node (LNODE) associated with the current best match pointer.

In a further aspect, the present invention relates to a router. In one embodiment, the router includes: (a) a packet processor, adapted to send search requests and receive search results from a search engine, (b) at least one memory, adapted to store nodes in a trie, which represents multiple prefixes, with a prefix distinguished by at least one step and each step indicated by one node, and (c) a search engine, adapted to read a node from the memory when receiving a search request from the packet processor, determine whether an offset field of the read node indicates that a matched prefix exists in an upper level node and, if a matched prefix exists, add the offset of the node to a pointer that points to a leaf array in the upper level node and update a current best match pointer; determine whether a branch flag of the node matches a corresponding bit of a search keyword and, if they match, determine whether the node has a child node according to a child bitmap and, if no child node exists, read an internal bitmap of the node, compute a longest matched prefix in the node according to the internal bitmap and a pointer that points to a leaf array in the node, update the current best match pointer with the computation result, compute an address of a LNODE associated with the current best match pointer, and send the computation result to the packet processor.

In one embodiment, the search engine is further configured to determine the number of branches of the node according to the type bitmap of the node when it is determined the node has a child node, and compute an address of a next node to be read according to the child bitmap, the type bitmap, a pointer pointing to a child array in the node and the corresponding bit of the search keyword, and read the next node from the memory. The search engine is also configured to determine whether comparison data of a read skip node (SNODE) equals corresponding bits of the search keyword when it is determined that a branch flag of the read SNODE matches the corresponding bit of the search keyword, and if the comparison data of the SNODE equals the corresponding bits of the search keyword, compute an address of a next node to be read according to a pointer pointing to a child array in the SNODE, and read the next node so that the search continues. Furthermore, the search engine is configured to compute a longest prefix in a read end node (ENODE) that matches the search keyword according to an internal bitmap of the ENODE and a pointer that points to a leaf array in the ENODE when it is determined that a branch flag of the read ENODE matches a corresponding bit of the search keyword, update a current best match pointer with the computation result, and compute an address of a leaf node (LNODE) associated with the current best match pointer.

In another embodiment, the search engine is further configured to determine whether the current best match pointer is effective when it is determined that a branch flag of the read node does not match a corresponding bit of the search keyword, and if the current best match pointer is effective, compute an address of a LNODE associated with the current best match pointer.

These and other aspects of the present invention will become apparent from the following description of the preferred embodiment taken in conjunction with the following drawings, although variations and modifications therein may be affected without departing from the spirit and scope of the novel concepts of the present application.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1A:
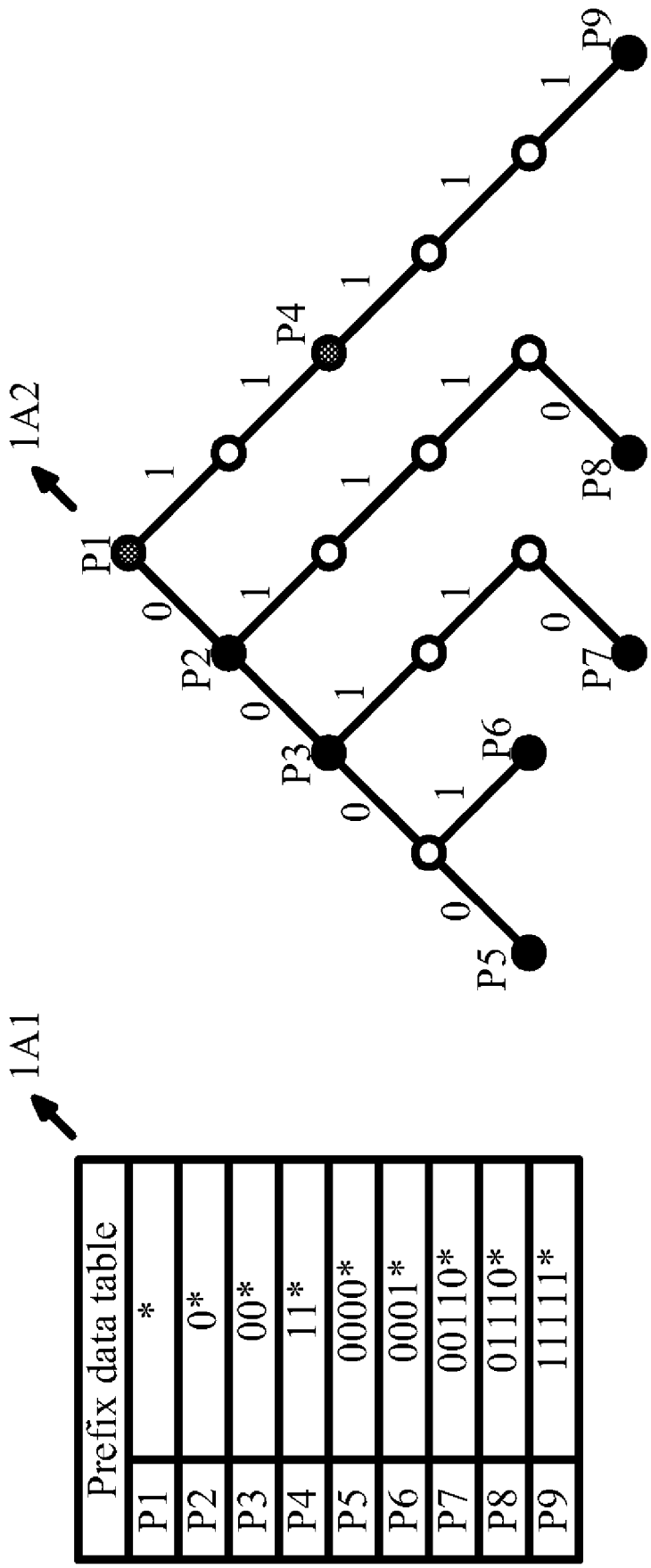
FIG. 1A shows a group of prefixes and a corresponding uni-bit trie.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings of FIGS. 1-12. In accordance with the purposes of this invention, as embodied and broadly described herein, this invention, in one aspect, relates to a method and apparatus for longest prefix matching based on a trie, to increase the search speed.

The following describes a few trie-based methods for longest prefix matching with reference to the accompanied drawings.

FIG. 1A shows a group of prefixes and a corresponding uni-bit trie, where the prefix data table 1A1 lists nine prefixes and the trie 1A2 is a uni-bit trie representation of the nine prefixes. Each node in the trie has at most two child nodes. One solid dot represents one prefix. For example, P7 is a solid dot. All bits along the path from the root node to P7 form the prefix associated with P7, namely, 00110.

When a packet is received, the search starts from the root node and bits of the destination address of the packet are used in turn. If 0 bit is encountered, the search goes on with the left child node of the current node; if 1 bit is encountered, the search goes on with the right child node of the current node. All prefixes encountered in the search process are recorded and the last prefix encountered is selected as the matching result. If the destination address is 01110, three prefixes, P1, P2 and P8, will be encountered in a search process. Because P8 is the longest, according to the principle of longest prefix matching, P8 is selected as the final matching result.

Figure 1B:
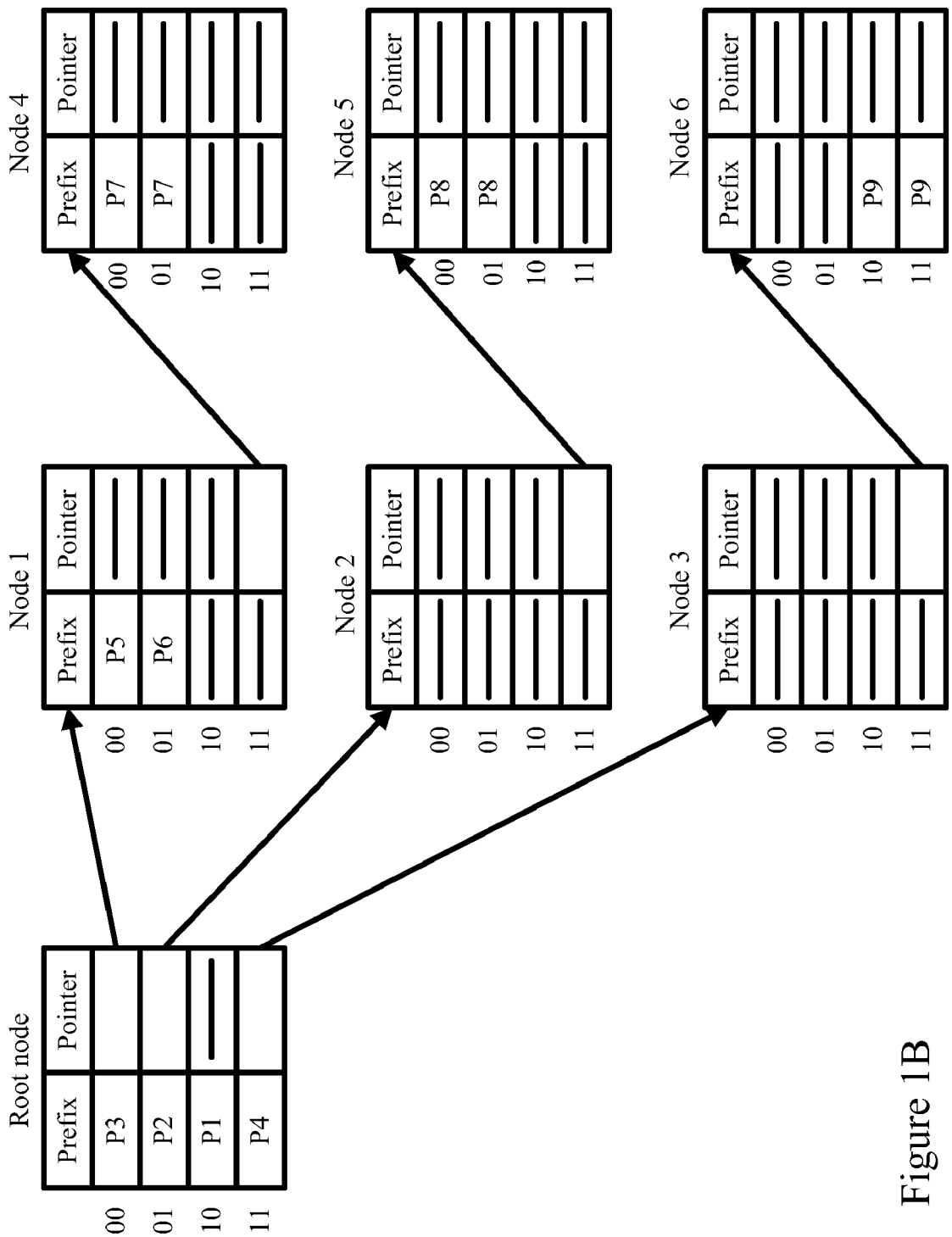
FIG. 1B shows a multi-bit trie corresponding to the prefixes in the prefix data table 1A1 in FIG. 1A.

When a uni-bit trie is used, if the length of a search keyword is W bits, the memory may be read for W times in the worst case. Such search performance is unable to satisfy actual needs. Later a multi-bit trie is adopted. With a multi-bit trie, multiple bits of a search keyword are used every time the memory is read. FIG. 1B shows a multi-bit trie corresponding to the prefixes listed in the prefix data table 1A1 in FIG. 1A. The step size is 2 bits, which means two bits are read each time. A prefix whose length is not an integer multiple of the step size should be expanded to multiple prefixes. But if the expanded prefix conflicts with an even longer prefix, the longest prefix matched when the prefix is not expanded is selected according to the principle of longest prefix matching. For example, for the root node, the prefix P1 needs to be expanded to 00*, 01*, 10*, and 11* and P2 needs to be expanded to 00* and 01*. Then for 00*, there are three candidate prefixes, P1, P2 and P3. Because P3 is the longest, P3 is written to the table entry associated with 00. In accordance with the same principle, P2 is written to the entry associated with 01 in the root node and P1 is written to the entry associated with 10 in the root node.

In a multi-bit trie data structure, if the step size is r bits, each TNODE has $2^r$ table entries. Each entry includes 2 fields that respectively indicate a next hop and a child pointer. For ease of description, a trie node is referred to as a node hereinafter. It is assumed that one node corresponds to a step size of r bits. With the multi-bit trie, when the node is searched, r bits of the search keyword are used. If the r bits are from bit i to bit i+r−1 of the search keyword (the most significant bit of the search keyword is supposed to be bit 1), by searching the node, the longest prefix that matches the search keyword can be found among all prefixes of i to i+r−1 bits. For a root node, i equals 1, during searching the root node, the longest prefix that matches the search keyword can be found among all prefixes of 0 to r bits.

Figure 1C:
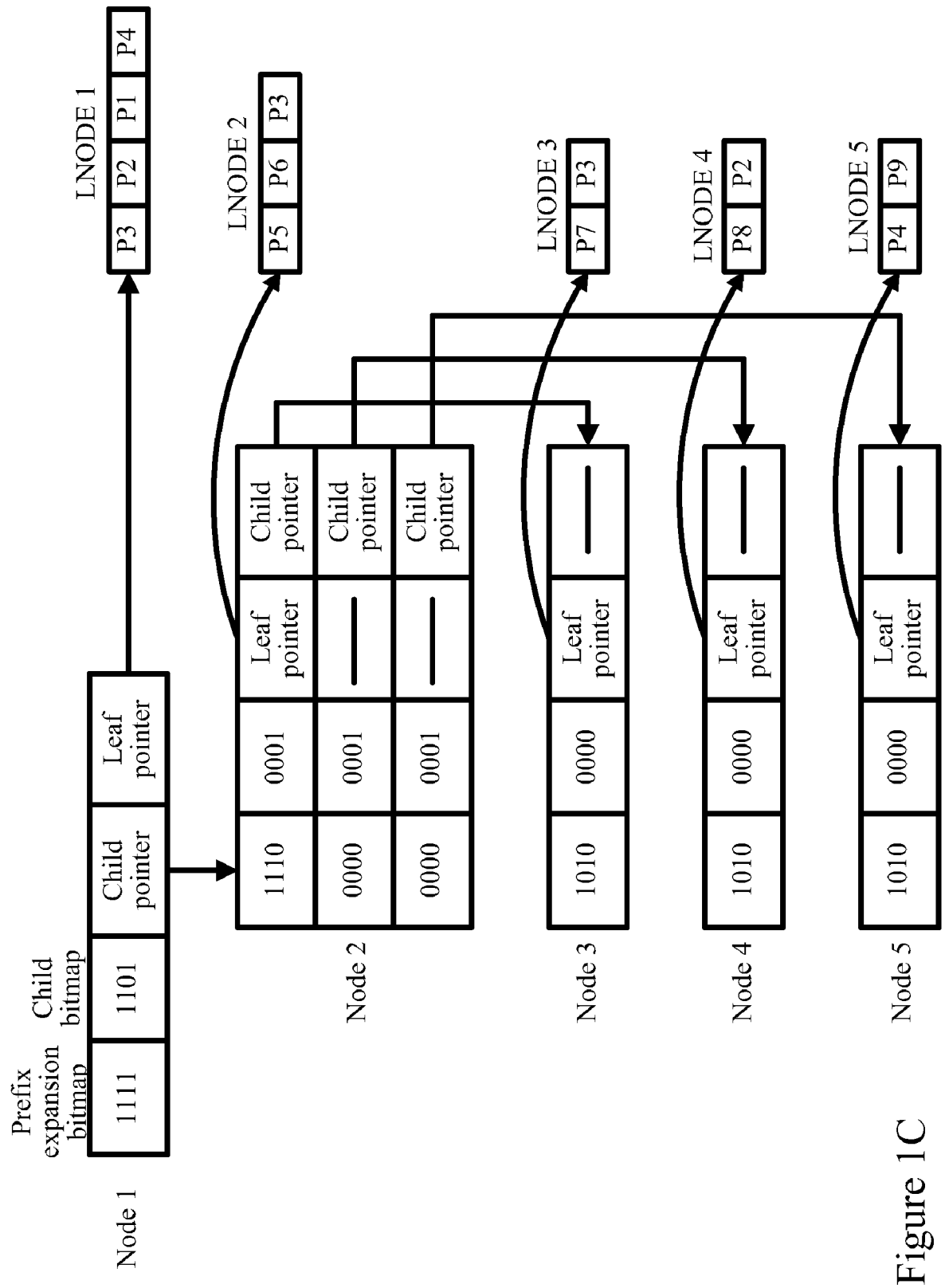
FIG. 1C shows a compressed multi-bit trie corresponding to the multi-bit trie in FIG. 1B.

If the search keyword is W bits long, the larger the step size is, more fewer times the memory is read, and more faster a search action is, but the waste of memory space becomes more serious. In view of this issue, a compressed multi-bit trie is proposed. FIG. 1C shows a compressed multi-bit trie corresponding to the multi-bit trie in FIG. 1B. For the step size of r bits, each node in a multi-bit trie has at most $2^r$ next hops and $2^r$ child pointers. To save storage space, in the compressed multi-bit trie shown in FIG. 1C, each node stores two bitmaps with the width of $2^r$ bits as well as two pointers. Each node stores one child bitmap and one child pointer. For the step size of r bits, a child bitmap has altogether $2^r$ bits. For each node, 1 indicates that the search should go on in the corresponding path; 0 indicates that the search can stop. All child nodes of a node are stored successively in the memory. Each node has a child pointer which indicates the address where the first child node of the node is stored in the memory. For example, in FIG. 1C, the child bitmap of node 1 is 1101, indicating that in the node, the search should go on if the index 00/01/11 is used when node 1 is searched and the search can stop if the index 10 is used. Node 1 has three child nodes, stored successively in the memory and associated with indexes 00, 01, and 11 respectively.

In a search process, a corresponding bit is first found in the child bitmap according to the search keyword. If the corresponding bit is 1, the search should continue. Then, the number of 1s is computed from the most signification bit to the found bit in the child map (exclusive of the found bit). With the computation result as an offset and the child pointer in the node as a base address, the two are added up and the result is used as the address to read from the memory for a next search. For example, when node 1 in FIG. 1C is searched, if the corresponding index in the search keyword is 11, according to the child bitmap 1101 of node 1, it can be computed that the offset of the node for searching relative to the start address of node 2 is 2, so the address for next access is the child pointer of node 1 plus 2.

Each node stores a prefix expansion bitmap and a leaf pointer. The prefix expansion bitmap has $2^r$ bits. A 1 bit indicates the path corresponds to one prefix; for a 0 bit, the bit position is recorded as s, and search goes on from bit s to the left of the prefix expansion bitmap. If the prefix associated with the first 1 bit that is found is Px, the prefix matching the path associated with bit s is also Px. In the prefix expansion bitmap, there may be multiple bits of 1. Next hop information of the prefixes associated with all bits of 1 is stored successively in the memory. A node storing next hop information is a LNODE. Each node stores a leaf pointer, indicating the address of the first next hop in the memory within the LNODE. For example, node 2 in FIG. 1C includes three nodes. The prefix expansion bitmap of the first node is 1110. If the index 11 is used when this node is searched, because 11 corresponds to a 0 bit in the prefix expansion bitmap, the search should go on to the left. If the first 1 bit found corresponds to the index 10, which matches the prefix P3, the index 11 is used to search the node, and the matched prefix is also P3.

In a search process, a corresponding bit is found in the prefix expansion bitmap according to the search keyword. If the corresponding bit is 1, the total number of 1s is computed from the most significant bit of the prefix expansion bitmap to the found bit (exclusive of the found bit). With the computation result as an offset and the leaf pointer in the node as a base address, the two are added up and the obtained address is used as the address in the memory for storing the next hop associated with the prefix matched in the node when the node is searched. If the corresponding bit is 0, the bit position is recorded as s and the search goes on from bit s to the left of the prefix expansion bitmap until the first 1 bit is found, and this 1 bit position is recorded as t. Then, the total number of 1s is computed from the most significant bit of the prefix expansion bitmap to bit t (exclusive of bit t). With the computation result as an offset and the leaf pointer in the node as a base address, the two are added up and the obtained address is used as the address in the memory for storing the next hop associated with the prefix matched in the node when the node is searched. For example, when node 3 in FIG. 1C is searched, if the corresponding index in the search keyword is 11, according to the prefix expansion bitmap 1010 of node 3, the offset of the corresponding next hop relative to the start address of the LNODE is 1. Therefore, the storage address of the next hop in the memory corresponding to the prefix matched in the node is the leaf pointer of the node plus 1.

If one node corresponds to a step size of r bits, as in a multi-bit trie, when the node is searched, r bits of the search keyword are used. The r bits are from bit i to bit i+r−1 of the search keyword (the most significant bit of the search keyword is supposed to be bit 1). By searching the node, the longest prefix that matches the search keyword can be found among all prefixes of i to i+r−1 bits. For a root node, i equals 1. By searching the root node, the longest prefix that matches the search keyword can be found among all prefixes of 0 to r bits.

If the step size is r bits and one node has at most $2^r$ child nodes, in a multi-bit trie, one pointer should be stored for a child node no matter whether the child node exists. In a compressed multi-bit tire, however, if a child node does not exist, it is only necessary to set a corresponding bit in the child bitmap to 0 without the need of other additional information. So, compared with a multi-bit trie, a compressed multi-bit trie requires much less memory space.

Likewise, if the step size is r bits and one node corresponds to at most $2^r$ next hops, in a multi-bit trie, each node has to store information of $2^r$ next hops. In a compressed multi-bit tire, however, if two or more successive indexes in a node match a same longest prefix in the node, it is only necessary to set a bit associated with the first index in the prefix expansion bitmap to 1 and the bits associated with the other indexes to 0. This means only one associated next hop needs to be stored in the memory. So, compared with a multi-bit trie, a compressed multi-bit trie requires much less memory space.

Nevertheless, with a compressed multi-bit trie, if the step size is r bits, still only r bits can be read at a time. The search speed is not higher than with a multi-bit trie and thus cannot satisfy the requirement of continuously growing line rates.

In addition, in a compressed multi-bit trie, the use of a prefix expansion bitmap can cause a problem. For example, in node 3 in FIG. 1C, the prefix expansion bitmap is 1010. The LNODE 3 stores the next hop information associated with two prefixes: P7 and P3. In FIG. 1B, the next hop information associated with P3 exists only in the root node. In FIG. 1C, however, this is obviously not the case. This is because, in node 3 in FIG. 1C, indexes 00 and 01 are associated with a same prefix, P7. So, the most significant two bits of the prefix expansion bitmap are 10. But the bits in the prefix expansion bitmap associated with indexes 10 and 11 cannot be set to 00. If they are set to 00, the prefix associated with indexes 10 and 11 will also be P7 according to the preceding matching method. It is obviously incorrect. Therefore, the bits associated with indexes 10 and 11 should be set to 10 in the prefix expansion bitmap. Accordingly, a next hop associated with P3 should be added in LNODE 3. So, the next hop information associated with one prefix is stored in both the LNODEs of the root node and the LNODEs of a child node. This will result in the waste of storage space and the update of next hop information will be slower.

Figure 2A:
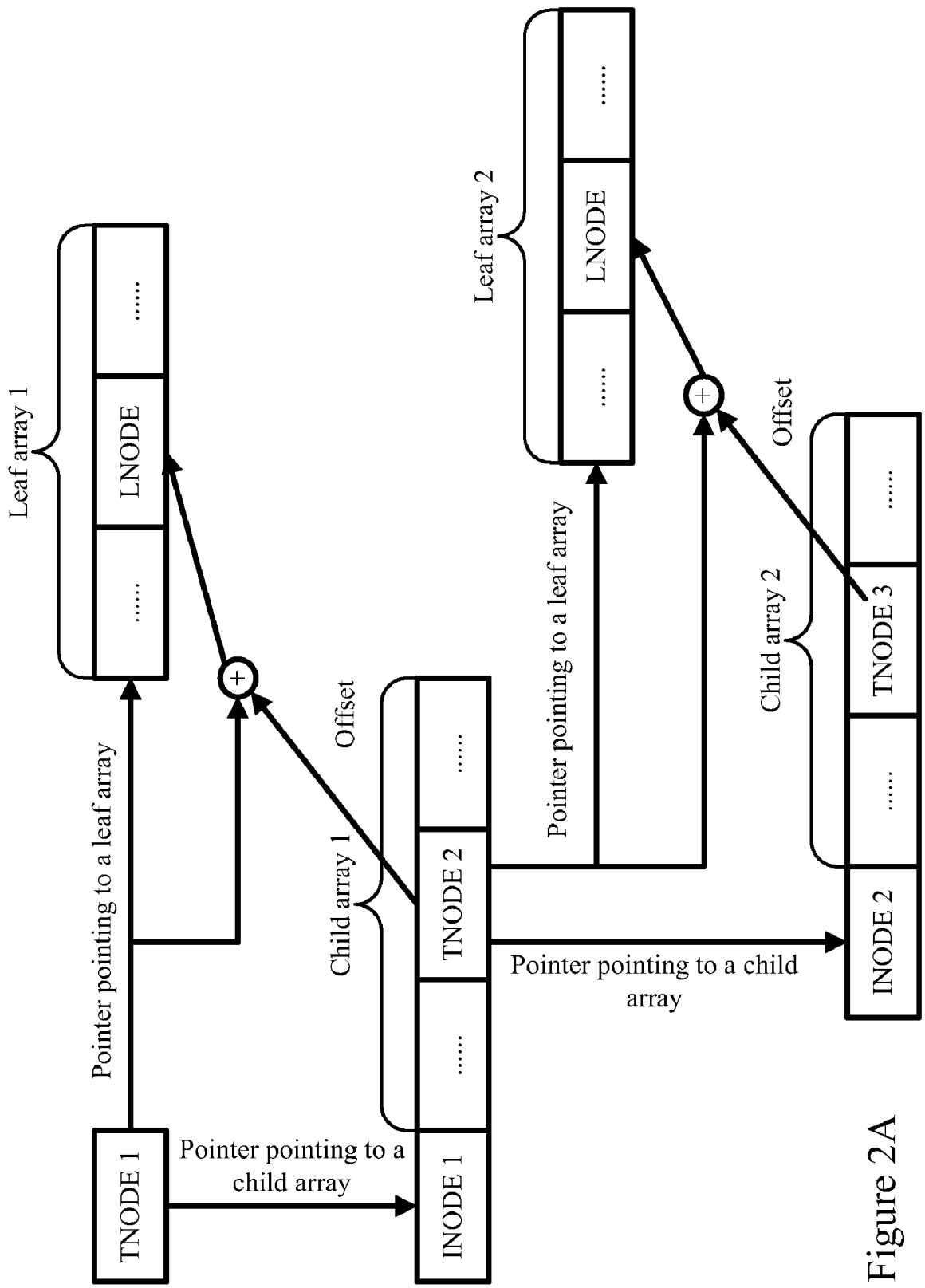
FIG. 2A shows the trie structure used in an embodiment of the present invention.

For easy understanding, the following describes the trie data structure used in embodiments of the present invention. As shown in FIG. 2A a trie used in embodiments of the present invention includes trie nodes (TNODE1, TNODE2 and TNODE3), internal nodes (INODE1 and INODE2), child array 1, child array 2, leaf array 1, leaf array 2 and the corresponding leaf nodes (LNODEs). Each TNODE has a pointer that points to a child array, indicating the base address of the child array, and a pointer that points to a leaf array, indicating the base address of the leaf array. Each TONDE stores an offset field, used to compute the child pointer in a search process. The offset field in each node indicates whether a matched prefix exists in the parent node of the current node, and further indicates the offset of the address of the next hop associated with the prefix relative to the pointer that points to a leaf array in the parent node if a matched prefix exists in the parent node of the current node.

An internal bitmap is stored inside an INODE, indicating the prefixes included by the TNODE corresponding to the INODE. All child nodes of the TNODE and the corresponding INODE, namely, a child array, are stored in succession. Each TNODE stores a pointer that points to the start address of the successive space, that is, a pointer pointing to the child array. If the sub-trie corresponding to a TNODE has no prefix, it is unnecessary to generate an INODE for the TNODE.

Figure 2B:
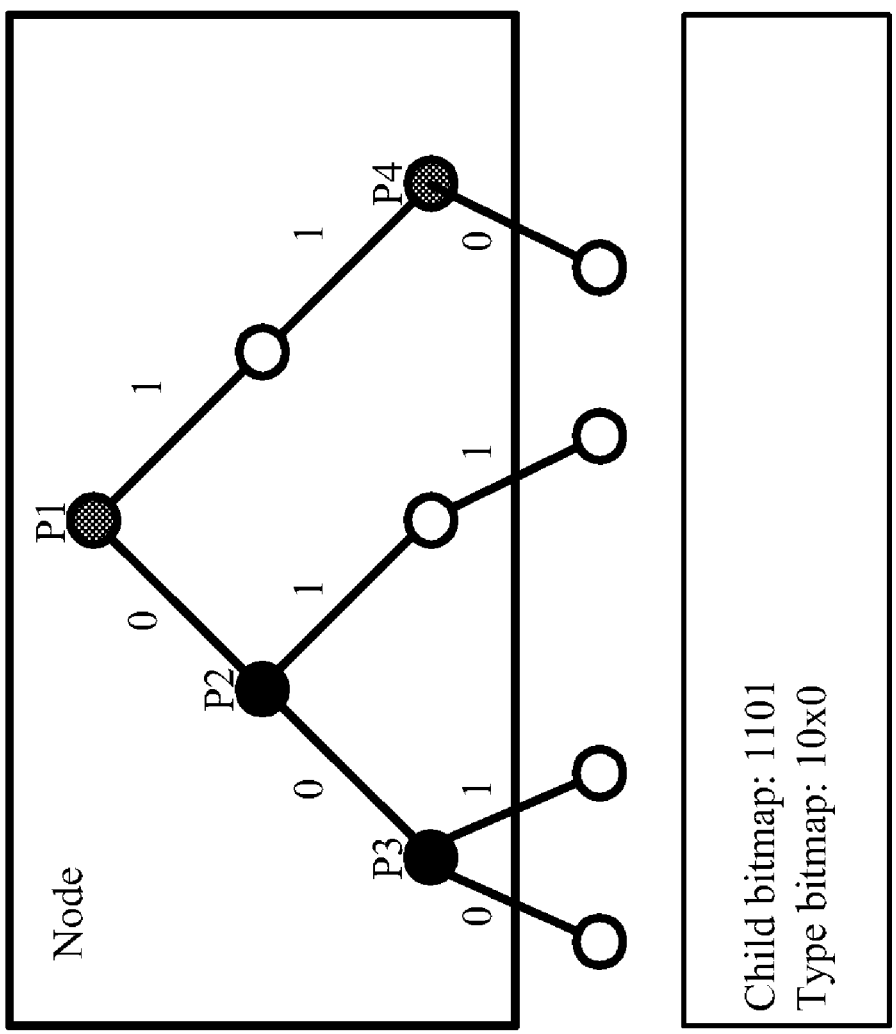
FIG. 2B shows a type bitmap of a TNODE in an embodiment of the present invention.

If the step size is r bits, the TNODE needs to store a child bitmap with a width of $2^r$ bits and a type bitmap with a width of $2^r$ bits. For a 1 bit in the child bitmap, if the corresponding bit in the type bitmap is 1, there are two branches after the corresponding path extends to the current node; if the corresponding bit in the type bitmap is 0, there is only one branch after the corresponding path extends to the current node, either a left branch or a right branch. A 0 bit in the child bitmap indicates no path extends to the current node, so there is no branch and it is unnecessary to determine the value of a corresponding bit in the type bitmap. The corresponding bit in the type bitmap is meaningless. It may be either 0 or 1. FIG. 2B shows a type bitmap in a node according to an embodiment of the present invention. For the node shown in the figure, the child bitmap is 1101. The path corresponding to index 10 has no child node, so the corresponding bit in the child bitmap is set to 0. The type bitmap is 10×0. Because there are two branches after the path corresponding to index 00 extends to the current node, the corresponding bit in the type bitmap is set to 1; because there is only one branch after the path corresponding to index 01 or 11 extends to the current node, that is, a right branch for index 01 and a left branch for index 11, the corresponding bit in the type bitmap is set to 0; because the path corresponding to index 10 does not extend to the current node, the corresponding bit in the child bitmap is 0, and the corresponding bit in the type bitmap is marked as x, indicating either 0 or 1.

After a child bitmap is combined with a type bitmap, two bitmaps with a width of $2^r$ bits are used altogether. Compared with the use of only a child bitmap, the number of bits needed changes from $2^r$ to $2^{r+1}$, but the bitmaps indicate whether each path has one or two branches after extending to the current node.

As previously described, if a path has only one branch after extending to the current node, according to the corresponding bit in the type bitmap, it is impossible to determine whether this branch is a left branch or a right branch. To solve the problem, a one-bit branch flag is added in each node. If this bit is 0, when the corresponding path extends to the parent node of the current node, the current node resides in the left branch of the path. If this bit is 1, when the corresponding path extends to the parent node of the current node, the current node resides in the right branch of the path.

In one embodiment, a $2^r$ bit wide child bitmap and a $2^r$ bit wide type bitmap are stored in a node. In a search process, after a node is read from a memory, take out r bits from the corresponding position in the search keyword, and then select a corresponding bit from the child bitmap according to the r bits. If this bit is 1, the corresponding path extends to the current node. After an AND operation on the child bitmap and the type bitmap, the result is a bitmap V. If a bit in the child bitmap is 0, the corresponding bit in the bitmap V is 0; if a bit in the child bitmap is 1, the corresponding bit in the bitmap V is the same as the corresponding bit in the type bitmap. Compute the total number of 1s is from the most significant bit of the child bitmap to the found bit (exclusive of the found bit) and express the result as sum1. Compute the total number of 1s is from the most significant bit of the bitmap V to the corresponding bit of the search keyword (exclusive of the corresponding bit of the search keyword) and express the result as sum2. Select a corresponding bit from the type bitmap according to the r bits taken from the search keyword and determine whether the bit is 1. If the bit is 1, the corresponding path extends to the current node and has two branches. Then, take the next bit from the search keyword and determine whether the search should go on along the left or right branch according to whether the bit is 0 or 1. If the bit taken from the search keyword is 0, the search should go on along the left branch, and an offset of (sum1+sum2) is added to a pointer that points to a child array in the node, and the result is used as the address of the node to be read from the memory for the next search. If the bit taken from the search keyword is 1, the search should go on along the right branch, and an offset of (sum1+sum2+1) is added to a pointer that points to a child array in the node, and the result is used as the address of the node to be read from the memory for the next search. If the bit selected from the type bitmap is 0, the corresponding path extends to the current node and has only one branch while it is unknown whether the branch is a left branch or a right branch. In this case, no matter whether the next bit taken from the search keyword matches the branch, the next child node is read and the search continues; an offset of (sum1+sum2) is added to a pointer that points to a child array in the node, and the result is used as the address of the node to be read from the memory for the next search.

As previously described, in a compressed multi-bit trie, the next hop information associated with one prefix is stored in both the LNODEs of the root node and the LNODEs of a child node. This results in waste of storage space and the update of next hop information is slower. To solve the problem, an internal bitmap is stored in an INODE. The internal bitmap indicates prefixes in the TNODE associated with the INODE. By searching the internal bitmap, the longest prefix in the TNODE that matches the search keyword can be found. The following describes two embodiments of implementation of the internal bitmap.

In the first embodiment of implementation, an internal bitmap is based on a prefix expansion bitmap with the addition of a $2^r$ bit wide prefix indication bitmap. A 1 bit in the prefix indication bitmap indicates that a prefix in the node matches the corresponding path. A 0 bit in the prefix indication bitmap indicates that no prefix in the node matches the corresponding path. For example, in FIG. 1C, the prefix expansion bitmap of node 3 is 1000 and the prefix indication bitmap is 1100.

Likewise, next hop information associated with all prefixes in a node is stored in the memory in succession and form a leaf array. During a search, a corresponding bit is first found in the prefix indication bitmap according to the search keyword. If the bit is 0, there is no matched prefix in the current node. If the bit is 1, continue to determine whether the corresponding bit in the prefix expansion bitmap is 1. If the corresponding bit in the prefix expansion bitmap is 1, compute the total number of 1s from the most significant bit of the prefix expansion bitmap to the found bit (exclusive of the found bit), take the computation result as an offset and a pointer that points to a leaf array in the upper level node, the TNODE associated with the INODE, as a base address, add up the two and use the result as the address in the memory for storing the next hop associated with the matched prefix found in the current node when the current node is searched. If the corresponding bit in the prefix expansion bitmap is 0, record the position of this bit as s, search the left of the prefix expansion bitmap from bit s until the first 1 bit is found, record the position of this first 1 bit as t, compute the total number of 1s from the most significant bit of the prefix expansion bitmap to bit t (exclusive of bit t), take the computation result as an offset and a pointer that points to a leaf array in the upper level node, the TNODE associated with the INODE, as a base address, add up the two and use the result as the address in the memory for storing the next hop associated with the matched prefix found in the current node when the current node is searched.

After the above method is adopted, the LNODE 3 in FIG. 1C no longer needs to store the next hop information associated with the prefix P3.

Figure 2C:
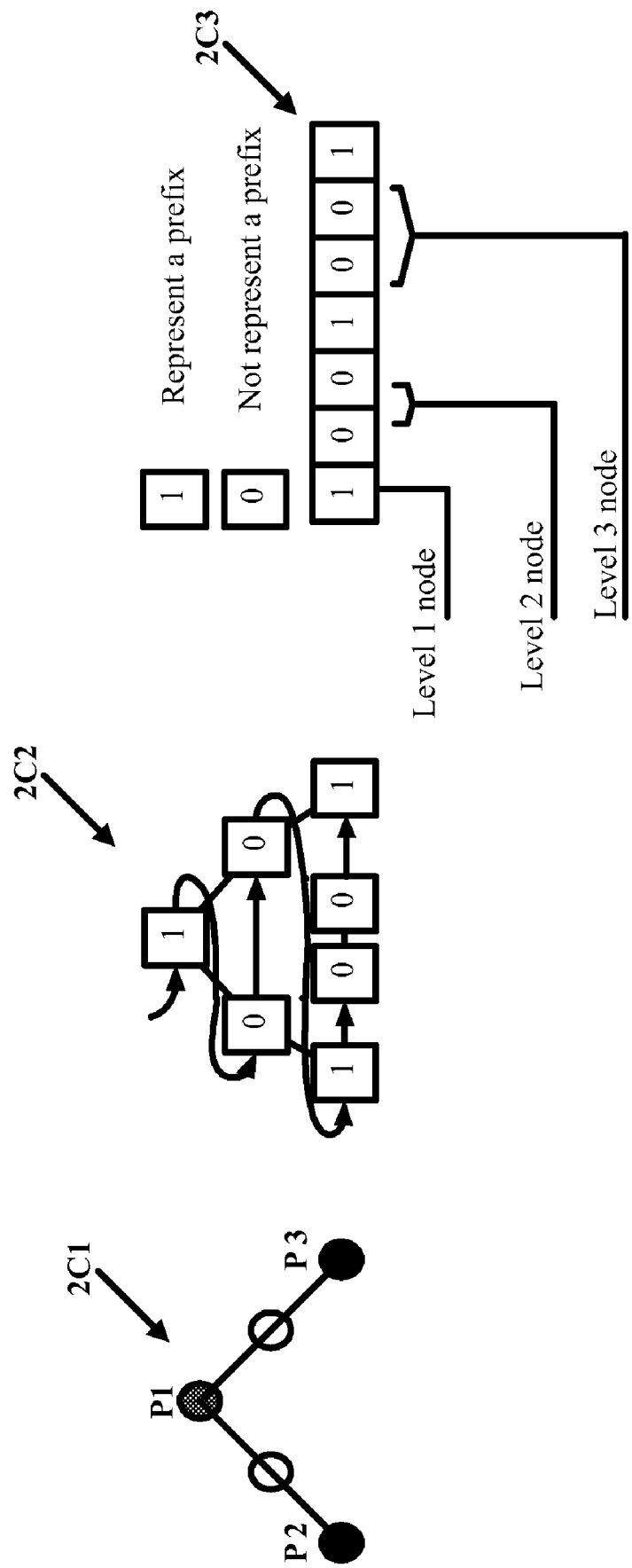
FIG. 2C shows a prefix bitmap in an embodiment of the present invention.

The second embodiment of implementation of the internal bitmap is shown in FIG. 2C, which is a prefix bitmap in an embodiment of the present invention. A $2^{r+1}-1$ bit wide prefix bitmap is used to take the place of the prefix expansion bitmap in a compressed multi-bit trie. A node with a step size of r actually corresponds to r+1 levels in a uni-bit trie. These nodes form a sub-trie 2C1 in the uni-bit trie. First the sub-trie 2C1 in the uni-bit trie is expanded to a full binary tree 2C2. Each point in the binary tree corresponds to one bit. If a point is associated with a prefix, the corresponding bit is 1, or else the bit is 0. Traverse the binary tree from the top down and from left to right to obtain a bitmap 2C3. This bitmap is a prefix bitmap. In FIG. 2C, the prefix bitmap finally generated according to the above method is 1001001 (2C3).

Likewise, next hop information associated with all prefixes in a node is stored in the memory in succession and form a leaf array. During a search, if the step size of a node is r bits, after the prefix bitmap of the node is read, determine whether there are matched prefixes at the r+1 level. If there are matched prefixes, select the longest prefix as the final matched prefix. After the matched prefix is selected, compute the total number of 1s from the most significant bit of the prefix bitmap to the bit associated with the prefix (exclusive of the bit). With the computation result as an offset and a pointer that points to a leaf array in the upper level node, the TNODE associated with the INODE, as a base address, add up the two and use the result as the address in the memory for storing the next hop associated with the matched prefix found in the current node when the current node is searched.

So, it is obvious that the use of a prefix bitmap eliminates the problem coming with a compressed multi-bit trie that the next hop information associated with one prefix is stored in both the LNODEs of the root node and the LNODEs of a child node. The price is that a prefix bitmap should have a width of $2^{r+1}-1$ bits.

In other words, a prefix expansion bitmap plus a prefix indication bitmap can avoid the problem arising when only the prefix expansion bitmap is adopted in a compressed multi-bit trie at the price of increasing the number of bits from $2^r$ to $2^{r+1}-1$; a prefix bitmap can also avoid the problem coming with the use of only the prefix expansion bitmap at the price of increasing the number of bits from $2^r$ to $2^{r+1}-1$. Hereinafter, both types of bitmaps are referred to as internal bitmaps.

It is understandable that the internal bitmap may not only be stored as an independent node, but also be stored together with other fields of the associated TNODE.

In one embodiment of the present invention, a trie data structure is used to search for the longest prefix that matches the search keyword. For ease of description, the longest prefix that matches the search keyword may be referred to as the longest matched prefix. A trie represents multiple prefixes. A prefix may be distinguished by at least one level, or at least one step. Each node may represent one step. Search for and maintain the address of a next hop associated with the longest matched prefix found in a search process and record this address as the current best match pointer. The process of reading a TNODE and determining the longest matched prefix in the TNODE is described as follows:

At first, the current TNODE in the trie is read. Then, whether the offset field of the TNODE indicates that a matched prefix exists in the upper level node is determined. If the matched prefix exists, the offset of the current TNODE is added to a pointer that points to a leaf array in the upper-level node, and the current best match pointer is updated accordingly. After it is determined that the branch flag of the TNODE matches the corresponding bit of the search keyword and the current TNODE has no child node according to a child bitmap, the internal bitmap of the TNODE is read, and the longest matched prefix in the TNODE is computed according to the internal bitmap and the pointer pointing to a leaf array in the TNODE. Then, the current best match pointer is updated with the computation result, and the address of the LNODE associated with the current best match pointer is computed.

In the embodiment, the step size of the TNODE is assumed to be r bits. According to the branch flag of the upper level node, it can be determined whether the path of the TNODE that extends to the upper level node matches one bit of the search keyword. Moreover, by reading the internal bitmap of the TNODE, it can be determined whether the path matches the next r bits of the search keyword. Therefore, when one node is read, r+1 bits of the search keyword can be processed. The search is faster than longest prefix matching based on a multi-bit trie or compressed multi-bit trie where only r bits of the search keyword can be processed when one node with a step size of r bits is read.

Figure 3A:
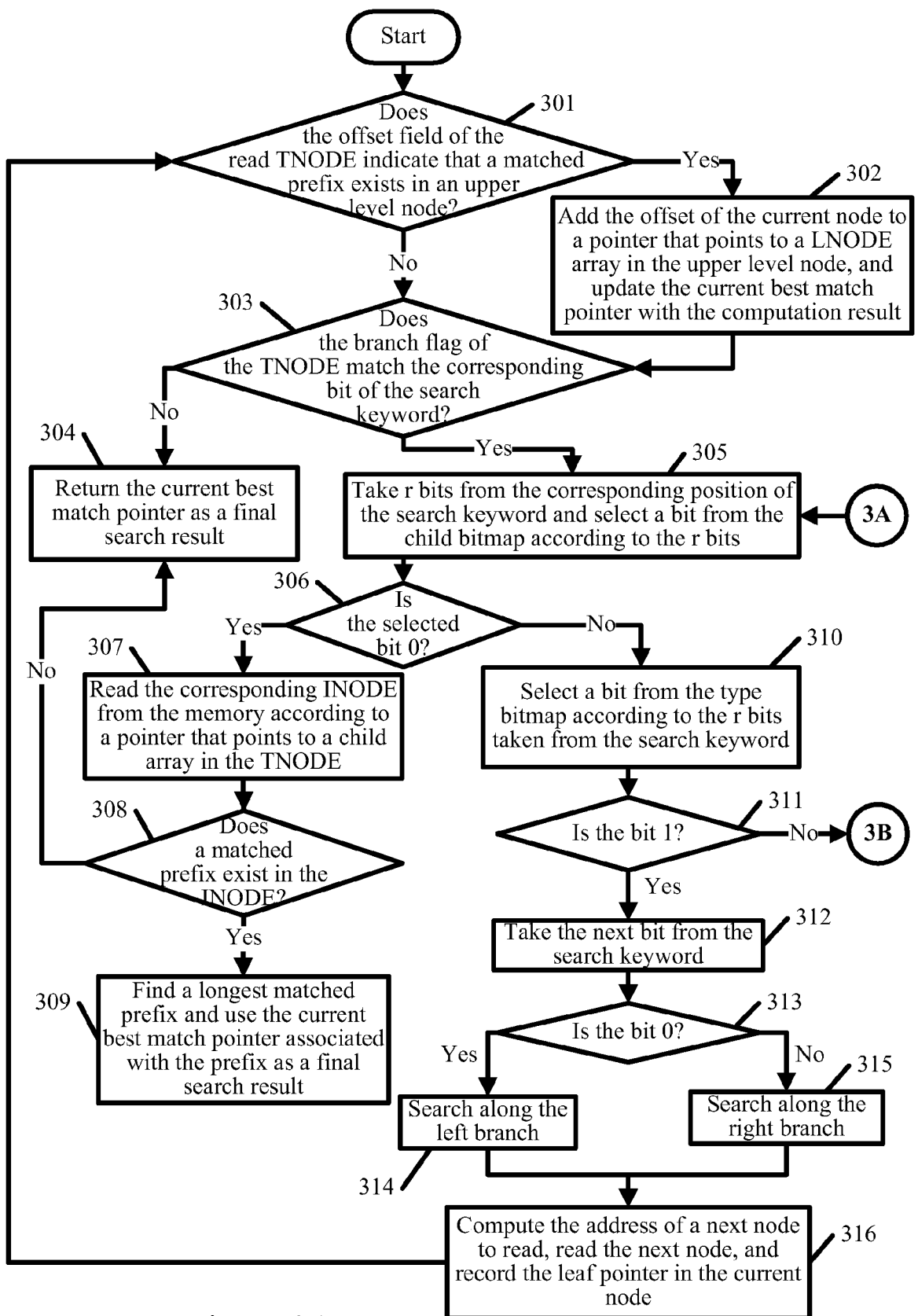
FIGS. 3A and 3B show a procedure of longest prefix matching in an embodiment of the present invention.
Figure 3B:
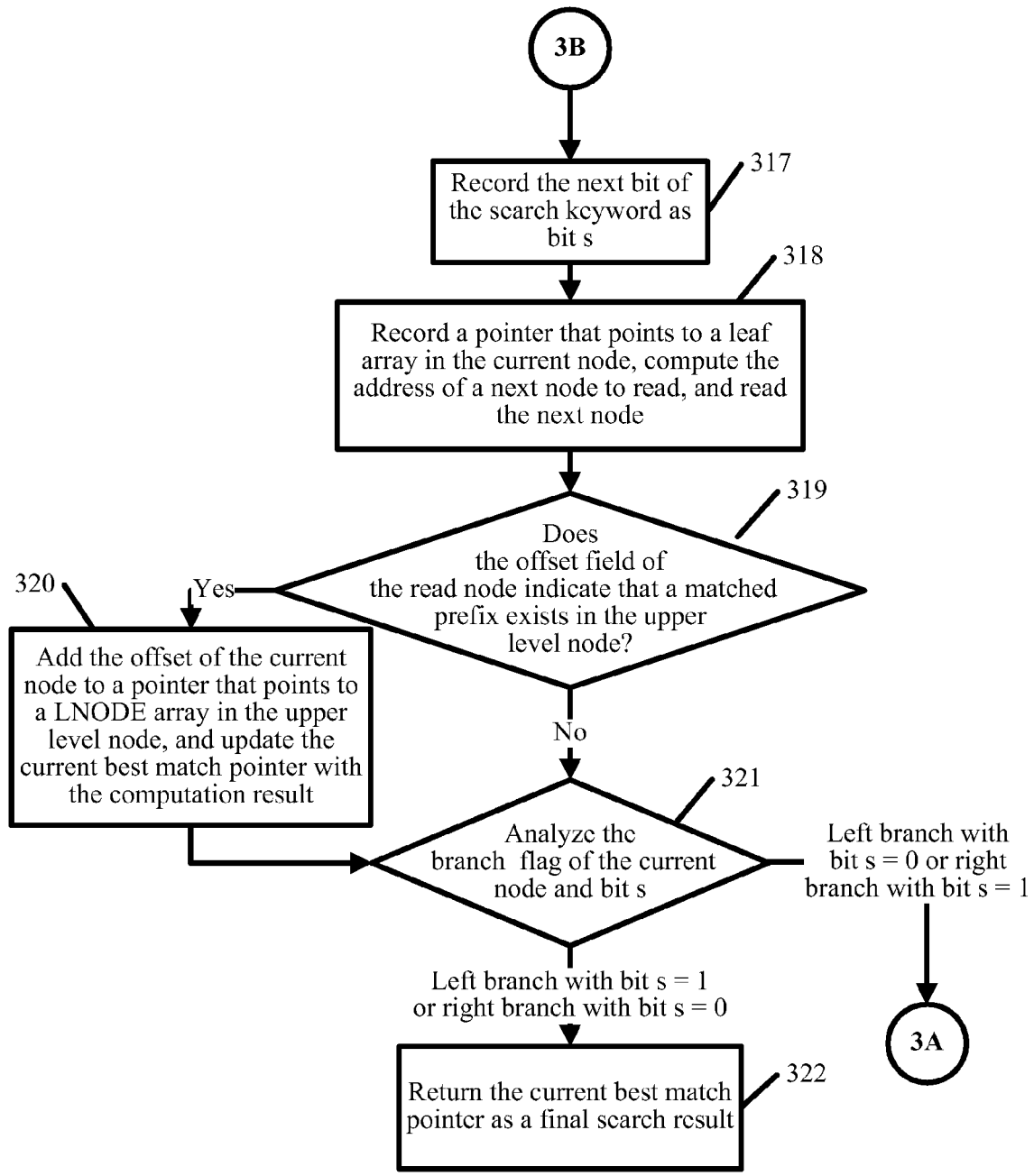

FIGS. 3A and 3B show a procedure of longest prefix matching according to an embodiment of the present invention. The following describes in detail the search process after a TNODE is read from the memory and how various fields defined in the trie are used, where the internal bitmap acts as an independent INODE stored in succession with the child nodes of the TNODE associated with the INODE. Search for and maintain the address of a next hop associated with the longest matched prefix found in the search process and record this address as the current best match pointer.

Block 301: Determine whether the offset field of the read TNODE indicates that a matched prefix exists in the upper level node and execute block 302 if a matched prefix exists in the upper level node, otherwise, if no matched prefix exists in the upper level node, execute block 303. As used herein in connection with a process or method, the term "block" is synonymous with the term "step". Thus, executing block 301 means executing or performing step 301. As known to people skilled in the art, each block, or step, contains one or more actions, or sub-steps, to be taken.

Block 302: Add the offset of the current node to a pointer that points to a leaf array in the upper node and update the current best match pointer with the computation result.

The offset field in a node indicates whether a matched prefix exists in the parent node of the current node, and further indicates the offset of the address of the next hop associated with the prefix relative to the pointer that points to a leaf array in the parent node if a matched prefix exists in the parent node of the current node.

Block 303: Determine whether the branch flag of the TNODE matches the corresponding bit of the search keyword and, if they match, execute block 305, otherwise, execute block 304.

In the embodiment of the present invention, if the branch flag of the TNODE does not match the corresponding bit of the search keyword, the search is along a wrong path.

Block 304: Return the current best match pointer as a final search result.

Block 305: In the embodiment, the TNODE includes a $2^r$ bit wide child bitmap and a $2^r$ bit wide type bitmap; take r bits from the corresponding position of the search keyword and select a bit from the child bitmap according to the r bits.

Block 306: Determine whether the bit selected from the child bitmap is 0 and, if the bit is 0, execute block 307, or if the bit is not 0, execute block 310.

Block 307: If the bit selected from the child bitmap is 0, the corresponding path does not extend to the current node. Read the associated INODE from the memory according to a pointer pointing to a leaf array in the TNODE.

Block 308: Because a pointer pointing to a leaf array is stored in the TNODE, compute whether a matched prefix exists in the INODE according to the internal bitmap in the INODE and the pointer pointing to a leaf array in the TNODE; if a matched prefix exists in the INODE, execute block 309, or a matched prefix does not exist in the INODE, execute block 304.

In the embodiment, the internal bitmap may be a combination of a prefix expansion bitmap and a prefix indication bitmap. It is understandable that the internal bitmap may also be one of the two prefix bitmap described earlier.

Block 309: Find a longest matched prefix and use the current best match pointer, namely the address of the next hop, associated with the prefix as a final search result.

Block 310: If the bit selected from the child bitmap is 1, the corresponding path extends to the current node. Select a bit from the type bitmap according to the r bits taken out from the search keyword.

Block 311: Determine whether the bit is 1 and if the bit is 1, execute block 312, or if the bit is not 1, execute block 317, as shown in FIG. 3B via the connection block (3B).

Block 312: If the bit selected from the type bitmap is 1, the corresponding path extends to the current node and has two branches. Take the next bit from the search keyword.

Block 313: Determine whether the search should go on along the left branch or the right branch according to whether the bit is 0 or 1; if the bit is 0, execute block 314 and if the bit is 1, execute block 315.

Block 314: Continue searching along the left branch and execute block 316.

Block 315: Continue searching along the right branch and execute block 316.

Block 316: Compute the address of the next node to be read according to the corresponding bit of the search keyword, the type bitmap, the child bitmap and the pointer pointing to a child array in the TNODE, record the pointer that points to a leaf array in the current node, and execute block 301 after the next node is read.

Block 317: If the corresponding bit in the type bitmap is 0, the corresponding path extends to the current node and has one branch but it is unknown whether the branch is a left branch or a right branch. Record the next bit of the search keyword as bit s and execute block 318.

Block 318: At this time, it is impossible to determine whether the bit s matches the existing branch. Compute the address of the next node to be read according to the corresponding bit of the search keyword, the type bitmap, the child bitmap and a child pointer in the TNODE, record the pointer that points to a leaf array in the current node, and execute block 319 after the next node is read.

Block 319: After the next node is read, determine whether the offset field of the read node indicates that a matched prefix exists in the upper level node and execute block 321 if no matched prefix exists in the upper level node; if a matched prefix exists in the upper level node, execute block 320.

Block 320: Add the offset of the current node to a pointer that points to a leaf array in the upper level node, update the current best match pointer with the computation result, and execute block 321.

Block 321: If the branch flag of the current node indicates a left branch and the bit s is 0 or if the branch flag of the current node indicates a right branch and the bit s is 1, execute block 305 in FIG. 3A via the connection block (3A) to further analyze the current node; if the branch flag of the current node indicates a left branch and the bit s is 1 or if the branch flag of the current node indicates a right branch and the bit s is 0, execute block 322.

Block 322: Return the current best match pointer as the final search result. The search process ends.

In the exemplary embodiment, when the corresponding bit in the child bitmap is 1 and the corresponding bit in the type bitmap is 0, although it is unknown whether the search keyword matches the existing branch, the child node associated with the branch is still read. Even if a wrong child node is read, the offset stored in the child node is correct, so it is possible to update the current best match pointer according to the offset stored in the child node and the pointer pointing a leaf array in the parent node. Then, it is only necessary to determine whether the search is along a wrong path according to the branch flag. If the search is along a wrong path, the search process ends. Otherwise, the search continues.

As inferred from the above procedure, if the corresponding bit of the child bitmap of the read TNODE is 1, it is unnecessary to read the associated INODE. If the corresponding bit in the child bitmap is 1, the next node will be read. According to the pointer stored in the upper level node that points to a leaf array and the offset stored in the next node, the next hop information associated with the longest matched prefix in the upper level node can be computed without reading the associated INCODE. If the corresponding bit in the child bitmap of the read TNODE is 0, it is necessary to read the INODE before computing the longest matched prefix in the current node. Moreover, the INODE and all child nodes of the current node are stored in succession. In hardware implementation, the current node is placed in memory p and the INODE and all child nodes of the current node are placed in memory q. Memory p will be read once and memory q will also be read once despite the corresponding bit in the child bitmap. It is impossible that any memory is read twice so the search efficiency is further improved. Therefore, it is good for streamlined hardware implementation to separate the internal bitmap from a node, store the internal bitmap separately in an INODE, and store the INODE with all child nodes of the associated TNODE in succession.

For the step size of r bits, in a compressed multi-bit trie, each node stores two $2^r$ bit wide bitmaps (a prefix expansion bitmap and a prefix indication bitmap) and two pointers. Every time a node is read, r bits of the search keyword are used. In the exemplary embodiment of the present invention, each TNODE also stores two $2^r$ bit wide bitmaps (a child bitmap and a type bitmap, while the internal bitmap is stored alone as an independent INODE) and two pointers. When a TNODE is read, however, r+1 bits of the search keyword are used. When the node size is unchanged, the number of bits processed each time is one more than that in a compressed multi-bit trie. Therefore, the search speed is also increased.

Figure 4:
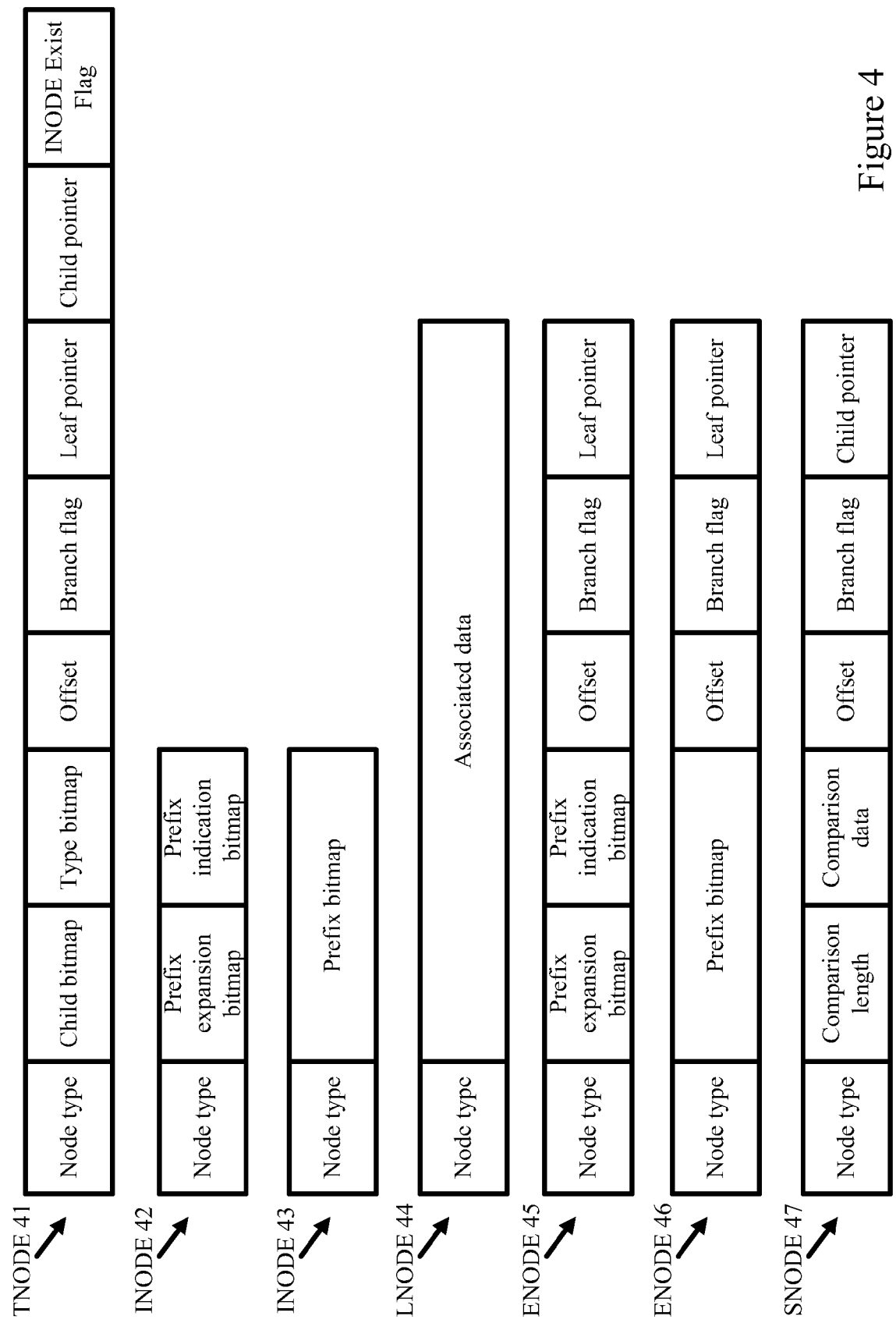
FIG. 4 shows node data structures in an embodiment of the present invention.

FIG. 4 shows node data structures according to one embodiment of the present invention. The node data structure 41 represents a TNODE. The following describes the fields of the TNODE in detail:

For the step size of r bits, a child bitmap has a width of $2^r$ bits. A child bitmap indicates whether the corresponding path extends to the current node. For example, it may be defined that if the corresponding bit in the child bitmap is 1, the path extends to the current node and it is necessary to continue with the search; if the corresponding bit in the child bitmap is 0, the path does no extend to the current node and it is unnecessary to continue with the search.

A type bitmap also has a width of $2^r$ bits. A type bitmap indicates the number of braches after the corresponding path extends to the current node. For example, it may be defined that if the corresponding bit in the type bitmap is 1, the path has two branches after extending to the current node; if the corresponding bit in the type bitmap is 0, the path has one branch after extending to the current node, either a left branch or a right branch.

The offset field is used to compute a pointer pointing to a leaf array in a search process. The offset field in each node indicates whether a matched prefix exists in the parent node of the current node, and also indicates the offset of the address of the next hop associated with the prefix relative to the pointer that points to a leaf array in the parent node if a matched prefix exists in the parent node of the current node.

The branch flag indicates whether the current node is in a left branch or a right brand of the current path when the current path extends to the parent node of the current node. For example, it may be defined that: if the branch flag is 0, the current node is in the left branch of the path; if the branch flag is 1, the current node is in the right branch of the path.

The leaf pointer indicates a pointer that points to the leaf array of the current node.

The child pointer indicates a pointer that points to the child array of the current node.

The INODE Exist Flag indicates whether an INODE exists. For example, it may be defined that: if the INODE Exist Flag is 1, an INODE exists; if the INODE Exist Flag is 0, no INODE exists. This flag avoids unnecessary search activities when no INODE exists.

Node data structures 42 and 43 represent two types of INODE. The node data structure 42 indicates matched prefixes in a node via the combination of a prefix expansion bitmap and a prefix indication bitmap. The node data structure 43 indicates matched prefixes in a node via a prefix bitmap. The node data structure 44 represents a LNODE, where the associated data field stores the next hop information associated with a prefix.

In addition to the TNODE and INODE, other types of nodes may be defined based on actual needs in search of a longest matched prefix in a trie, to further increase the search speed. For example, when a node has no child node, it is no longer necessary to store the child bitmap and type bitmap of the node. In this case, the internal bitmap may be stored inside the node so that one memory read is spared and the search is faster. This node can be called an end node (ENODE). According to the two presentations of an internal bitmap, an ENODE may be defined in either the node data structure 45 or the node data structure 46. The node data structure 46 is a format where the internal bitmap is a prefix bitmap. When uni-branch paths appear continuously in a trie, a skip node (SNODE) may be adopted so that multiple bits are compared at a time to achieve a higher search speed. A SNODE is presented in the node data structure 47, where the comparison length means the number of bits compared at a time.

The offset field, branch flag and LNODE Exist Flag in a SNODE or ENODE may be defined in a same way as those in a TNODE.

Figure 5:
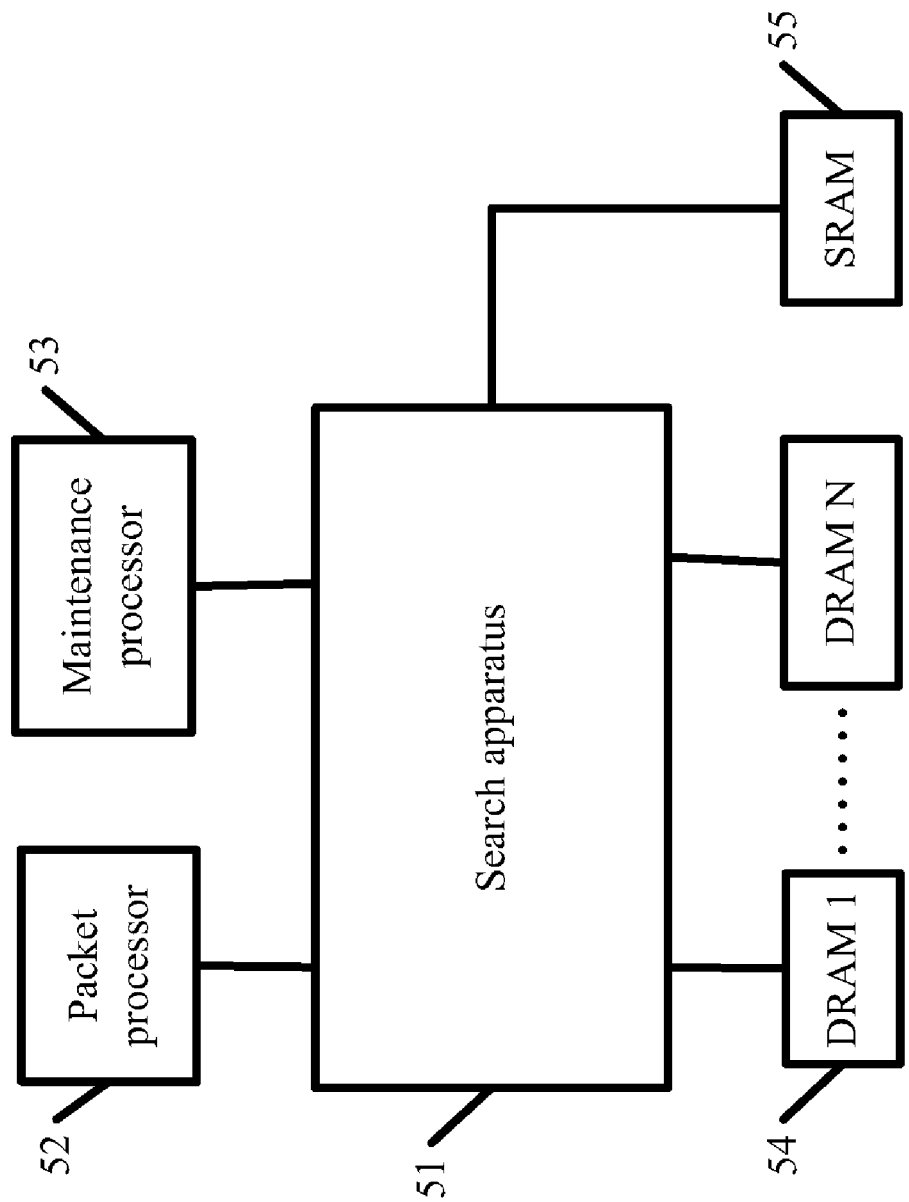
FIG. 5 shows a search system structure in an embodiment of the present invention.
Figure 6A:
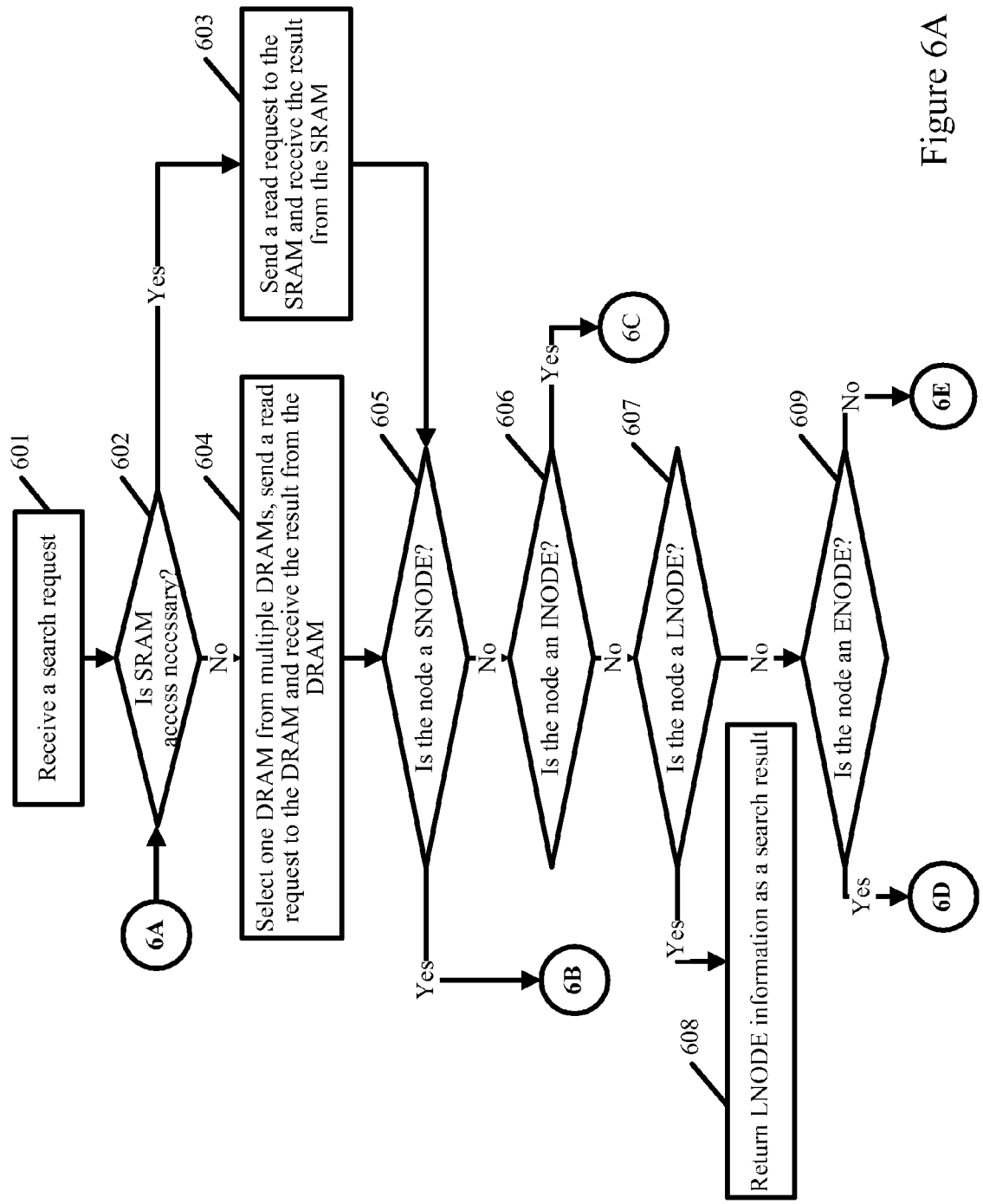
FIGS. 6A-6E show a procedure of longest prefix matching in another embodiment of the present invention.
Figure 6B:
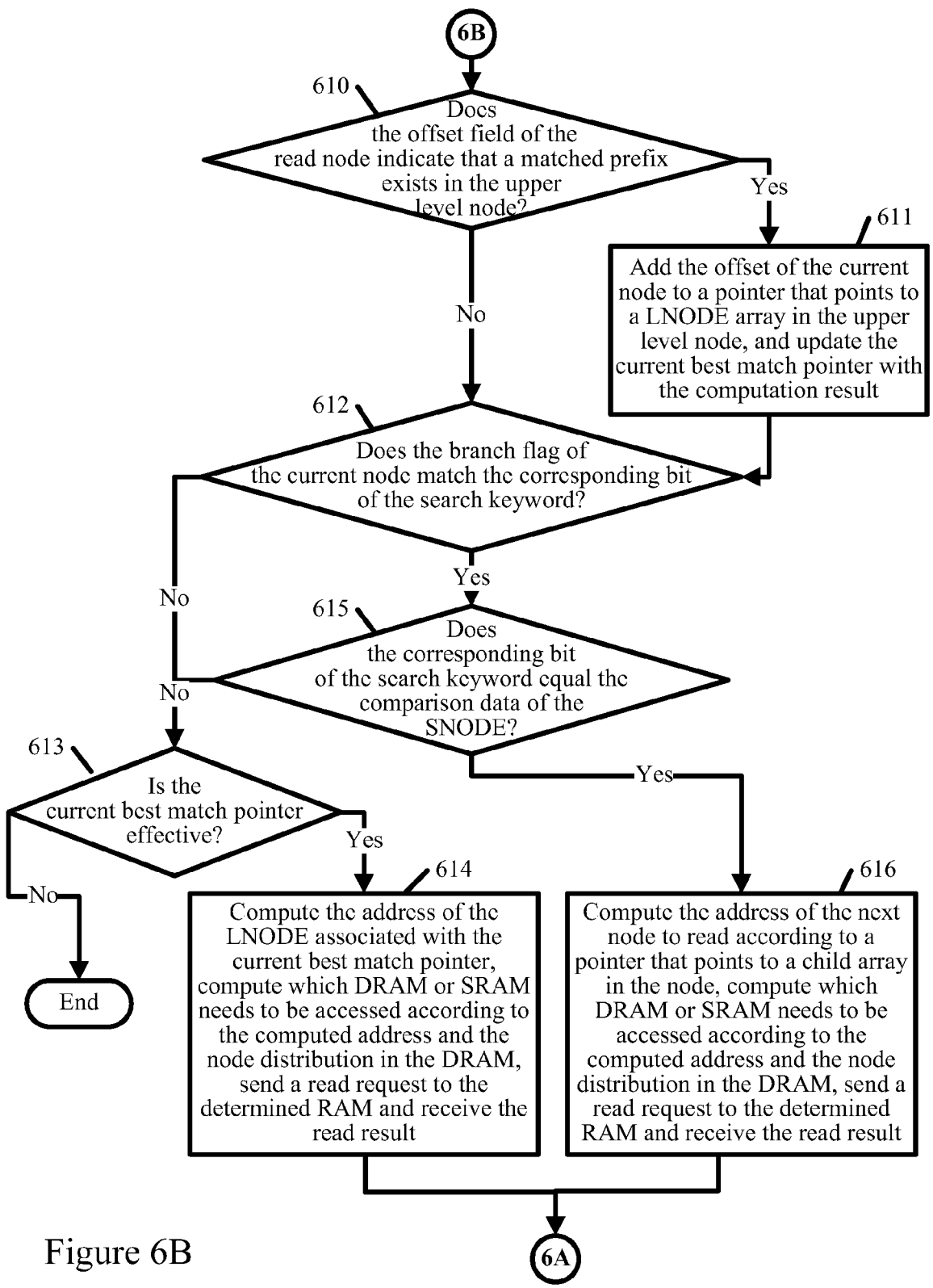
Figure 6C:
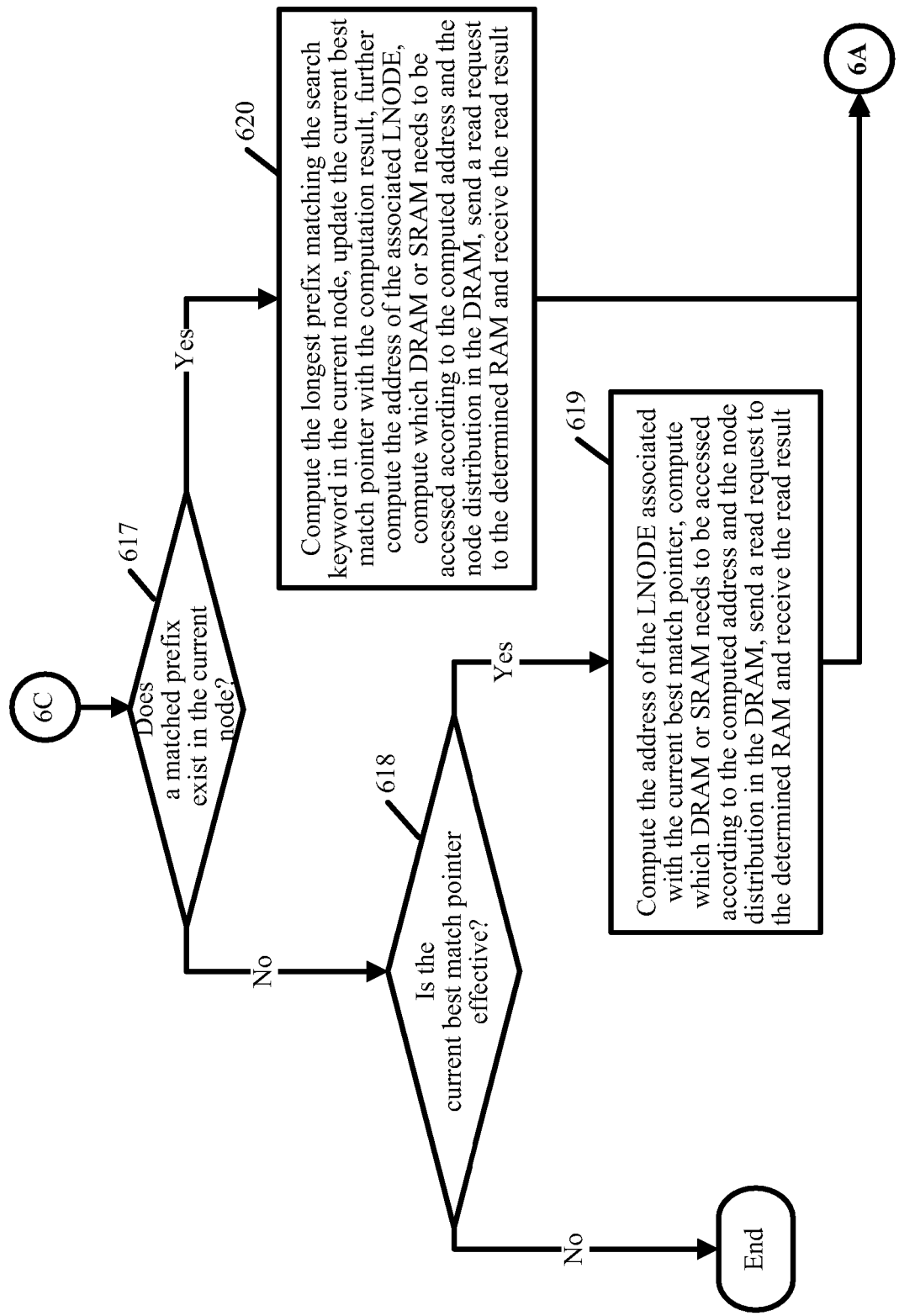
Figure 6D:
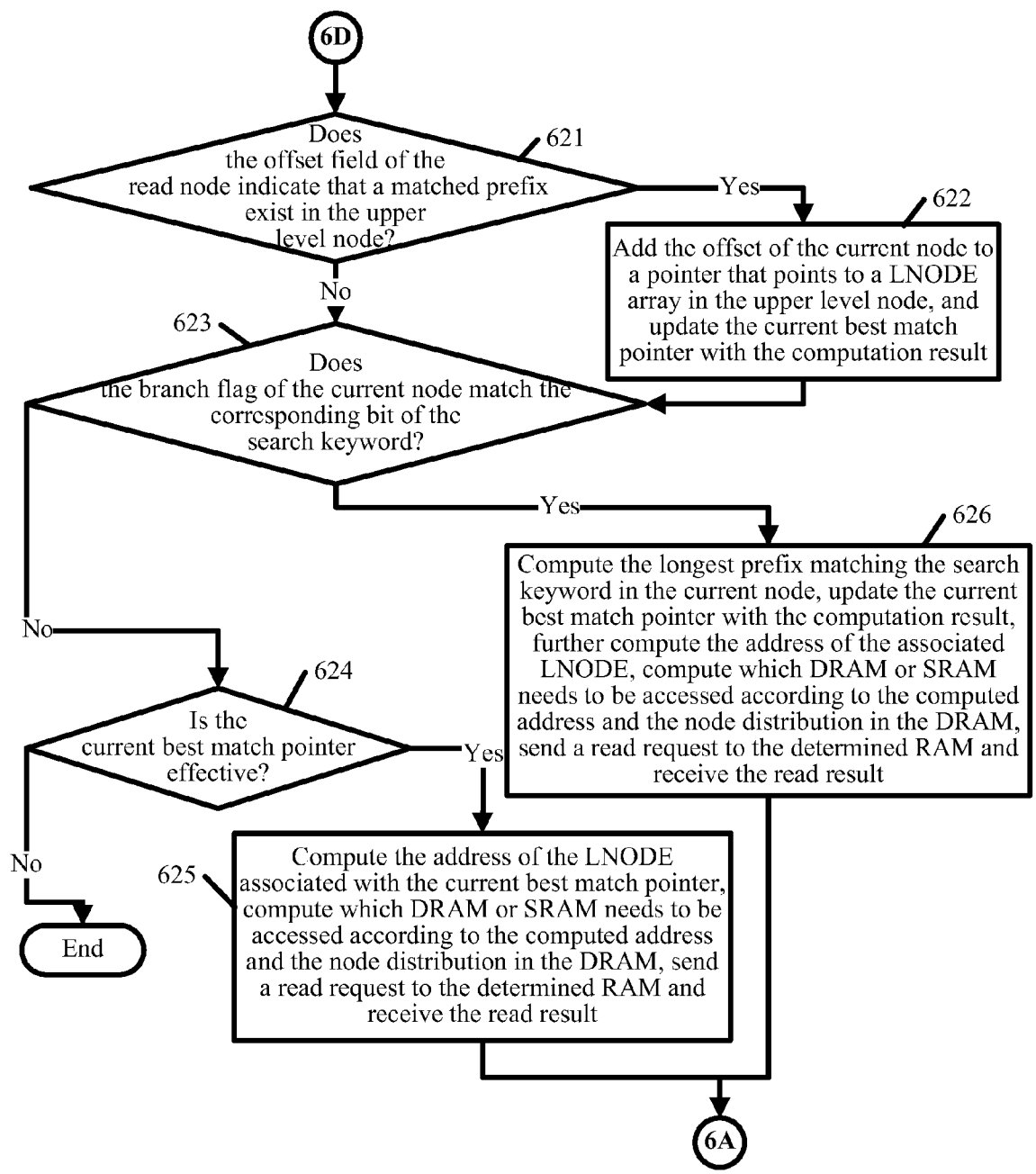
Figure 6E:
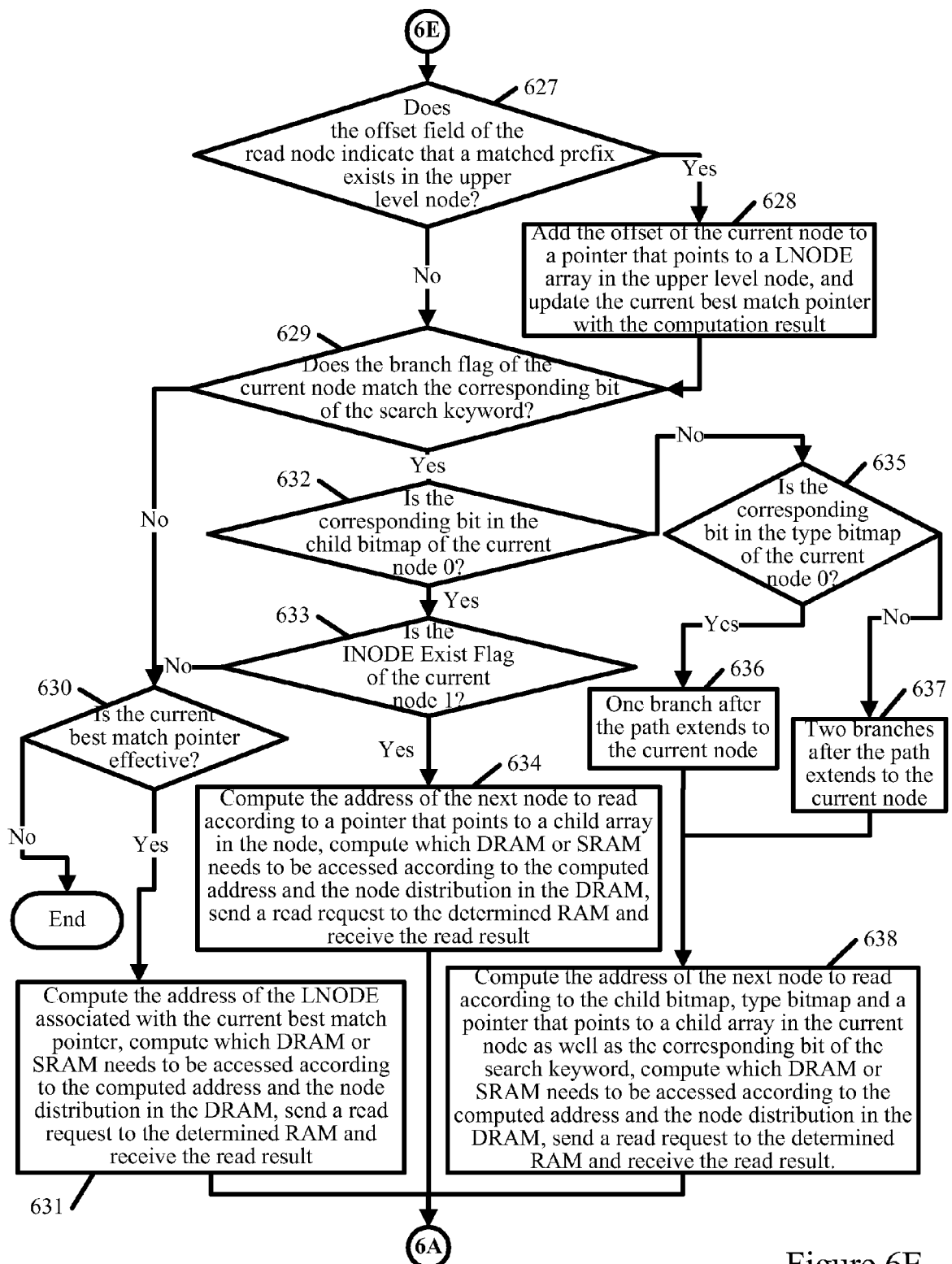

FIG. 5 shows a search system according to one embodiment of the present invention. The search system is adapted to search for the longest matched prefix and may include a search apparatus 51, a packet processor 52, a maintenance processor 53, at least one dynamic random access memory (DRAM) 54, and at least one static random access memory (SRAM) 55. The search apparatus 51 receives search requests from the packet processor 52 and returns the search results to the packet processor 52. The search apparatus 51 receives various instructions from the maintenance processor 53 and reads or writes the DRAM 54 and the SRAM 55 according to the instructions and returns the execution results to the maintenance processor 53.

The search apparatus 51 may connect at least one DRAM and at least one SRAM. The SRAM may be off-chip or on-chip. All nodes are stored in one standalone RAM or multiple RAMs according to the needs of the search speed. One DRAM may include multiple banks. One node may be stored in one bank or multiple banks of a DRAM.

Taking the search of a longest matched prefix in a trie as an example, the following details the method for longest prefix matching in an embodiment of the present invention.

FIGS. 6A-6E show a procedure of longest prefix matching according to one embodiment of the present invention. FIG. 4 presents the structures of TNODE, INODE and LNODE and those of SNODE and ENODE after the TNODE is optimized in view of the different positions of nodes in a path. The following describes the procedure of longest prefix matching in reading each type of node defined in FIG. 4. Unlike the procedure in the previous embodiment, during a search process, this procedure first determines the node type and varies with the node type. For example, when a SNODE is read, if it is determined that the branch flag of the SNODE matches the corresponding bit of the search keyword and the comparison data of the SNODE equals the corresponding bit of the search keyword, the address of the next node to be read may be computed according to a pointer that points to a child array in the SNODE and the next node is read so as to continue the search process. When an ENODE is read, it is necessary to determine whether the branch flag of the ENODE matches the corresponding bit of the search keyword. If they match, the longest prefix in the ENODE that matches the search keyword may be computed according to the internal bitmap of the ENODE and a pointer that points to a leaf array in the ENODE. Then, the current best match pointer is updated with the computation result and the address of the LNODE associated with the current best match pointer is computed. The procedure is detailed as follows:

Block 601: Receive a search request.

Block 602: Determine whether it is necessary to read the SRAM and, if it is necessary to read the SRAM, execute block 603, or if it is not necessary to read the SRAM, execute block 604.

Block 603: Send a read request to the SRAM and execute block 605 after a result is received from the SRAM.

Block 604: Choose one from multiple DRAMs according the node distribution in the DRAM, send a read request to the chosen DRAM and execute block 605 after a result is received from the DRAM.

Block 605: Determine whether the node is a SNODE and if the node is a SNODE, execute block 610 in FIG. 6B via the connection block (6B), or if the node is not a SNODE, execute block 606.

Block 606: Determine whether the node is an INODE and if the node is an INODE, execute block 617 in FIG. 6C via the connection block 6C, or if the node is not an INODE, execute block 607.

Block 607: Determine whether the node is a LNODE and if the node is a LNODE, execute block 608, or if the node is not LNODE, execute block 609.

Block 608: Return the LNODE information as the search result and the search process ends.

Block 609: Determine whether the current node is an ENODE and if the current node is an ENODE, continue with block 621 in FIG. 6D via the connection block (6D), or if the current node is not an ENODE, continue with block 627 in FIG. 6D.

Block 610: Determine whether the offset field of the read node indicates that a matched prefix exists in the upper level node, and execute block 612 if no matched prefix exists in the upper level node; if a matched prefix exists in the upper level node, execute block 611.

Block 611: Add the offset of the current node to a pointer that points to a leaf array in the upper level node, update the current best match pointer with the computation result, and execute block 612.

Block 612: Determine whether the branch flag of the current node matches the corresponding bit of the search keyword, that is, whether the search is along a wrong path, and if the search is along a wrong path, execute block 613, or if the search is not along a wrong path, execute block 615.

Block 613: Determine whether the current best match pointer is effective, and if the current best match pointer is not effective, the search fails and the search process ends; if the current best match pointer is effective, execute block 614.

Block 614: Compute the address of the LNODE associated with the current best match pointer, compute which DRAM or SRAM needs to be accessed according to the computed address and the node distribution in the DRAM, send a read request to the determined RAM and continue with block 602 in FIG. 6A via the connection block (6A) after the read result is received.

Block 615: Determine whether the corresponding bits of the search keyword equals the comparison data in the SNODE, and if the corresponding bit of the search keyword equals the comparison data in the SNODE, continue with block 616, or if the corresponding bit of the search keyword does not equal the comparison data in the SNODE, continue with block 613.

The number of compared bits in the SNODE may be indicated by the comparison length field in the SNODE.

Block 616: Compute the address of the next node to be read according to a pointer that points to a child array in the node, compute which DRAM or SRAM needs to be accessed according to the computed address and the node distribution in the DRAM, send a read request to the determined RAM and continue with block 602 in FIG. 6A via the connection block (6A) after the read result is received.

Block 617: Determine whether a matched prefix exists in the node and if the matched prefix does not exist in the node, continue with block 618, or if the matched prefix exists in the node, continue with block 620.

Block 618: Determine whether the current best match pointer is effective and if the current best match pointer is not effective, the search fails and the search process ends; if the current best match pointer is effective, execute block 619.

Block 619: Compute the address of the LNODE associated with the current best match pointer, compute which DRAM or SRAM needs to be accessed according to the computed address and the node distribution in the DRAM, send a read request to the determined RAM and continue with block 602 in FIG. 6A via the connection block (6A) after the read result is received.

Block 620: Compute the longest prefix in the current node that matches the search keyword according the internal bitmap and a pointer that points to a leaf array in the upper level node and update the current best match pointer with the computation result; compute the address of the LNODE associated with the current best match pointer, and compute which DRAM or SRAM needs to be accessed according to the computed address and the node distribution in the DRAM; send a read request to the determined RAM and continue with block 602 in FIG. 6A via the connection block (6A).

Block 621: Determine whether the offset field of the read node indicates that a matched prefix exists in the upper level node and execute block 623 if no matched prefix exists in the upper level node; if a matched prefix exists in the upper level node, execute block 622.

Block 622: Add the offset of the current node to a pointer that points to a leaf array in the upper level node, update the current best match pointer with the computation result, and execute block 623.

Block 623: Determine whether the branch flag of the current node matches the corresponding bit of the search keyword and, if the branch flag of the current node matches the corresponding bit of the search keyword, execute block 626, or if the branch flag of the current node does not match the corresponding bit of the search keyword, execute block 624.

Block 624: Determine whether the current best match pointer is effective, and if the current best match pointer is not effective, the search fails and the search process ends; if the current best match pointer is effective, execute block 625.

Block 625: Compute the address of the LNODE associated with the current best match pointer, compute which DRAM or SRAM needs to be accessed according to the computed address and the node distribution in the DRAM, send a read request to the determined RAM and continue with block 602 in FIG. 6A via the connection block (6A) after the read result is received.

Block 626: Compute the longest prefix in the current node that matches the search keyword according the internal bitmap and a pointer that points to a leaf array in the current node and update the current best match pointer with the computation result; compute the address of the LNODE associated with the current best match pointer, and compute which DRAM or SRAM needs to be accessed according to the computed address and the node distribution in the DRAM; send a read request to the determined RAM and continue with block 602 in FIG. 6A via the connection block (6A).

Block 627: Determine whether the offset field of the read node indicates that a matched prefix exists in the upper level node and execute block 629 if no matched prefix exists in the upper level node; if a matched prefix exists in the upper level node, execute block 628.

Block 628: Add the offset of the current node to a pointer that points to a leaf array in the upper level node, update the current best match pointer with the computation result, and execute block 629.

Block 629: Determine whether the branch flag of the current node matches the corresponding bit of the search keyword, that is, whether the search is along a wrong path, and if the search is along a wrong path, execute block 630, or if the search is not along a wrong path, execute block 632.

Block 630: Determine whether the current best match pointer is effective and if not, the search fails and the search process ends; if the current best match pointer is effective, execute block 631.

Block 631: Compute the address of the LNODE associated with the current best match pointer, compute which DRAM or SRAM needs to be accessed according to the computed address and the node distribution in the DRAM, send a read request to the determined RAM and continue with block 602 in FIG. 6A via the connection block (6A) after the read result is received.

Block 632: Determine whether the corresponding bit in the child bitmap of the current node is 0 according to the search keyword and if the bit is 0, execute block 633, or if the bit is 1, execute block 635.

Block 633: Determine whether the INODE Exist Flag of the current node is 1, and if the INODE Exist Flag of the current node is 1, execute block 634, or if the INODE Exist Flag of the current node is 0, execute block 630.

Block 634: Compute the address of the next node to be read according to a pointer that points to a child array in the node, compute which DRAM or SRAM needs to be accessed according to the computed address and the node distribution in the DRAM, send a read request to the determined RAM and continue with block 602 in FIG. 6A via the connection block (6A) after the read result is received.

Block 635: Determine whether the corresponding bit in the type bitmap of the current node is 0 according to the search keyword and if the bit is 0, execute block 636, or if the bit is 1, execute block 637.

Block 636: Determine that the corresponding path has one branch after extending to the current node and execute block 638.

Block 637: Determine that the corresponding path has two branches after extending to the current node and execute block 638.

Block 638: Compute the address of the next node to be read according to the child bitmap, type bitmap and a pointer that points to a child array in the current node as well as the corresponding bit of the search keyword, compute which DRAM or SRAM needs to be accessed according to the computed address and the node distribution in the DRAM, send a read request to the determined RAM and continue with block 602 in FIG. 6A via the connection block (6A) after the read result is received.

The above describes a procedure of longest prefix matching based on a trie. It is understandable that the execution sequence in the embodiment of the present invention is not unique. For example, the procedure may first determine whether the branch flag of the read node matches the corresponding bit of the search keyword and then determine the node type if they match. Moreover, the sequence for determining the node type is not limited. For example, the procedure may first determine whether the node is a TNODE or first determine whether the node is a LNODE.

Figure 7:
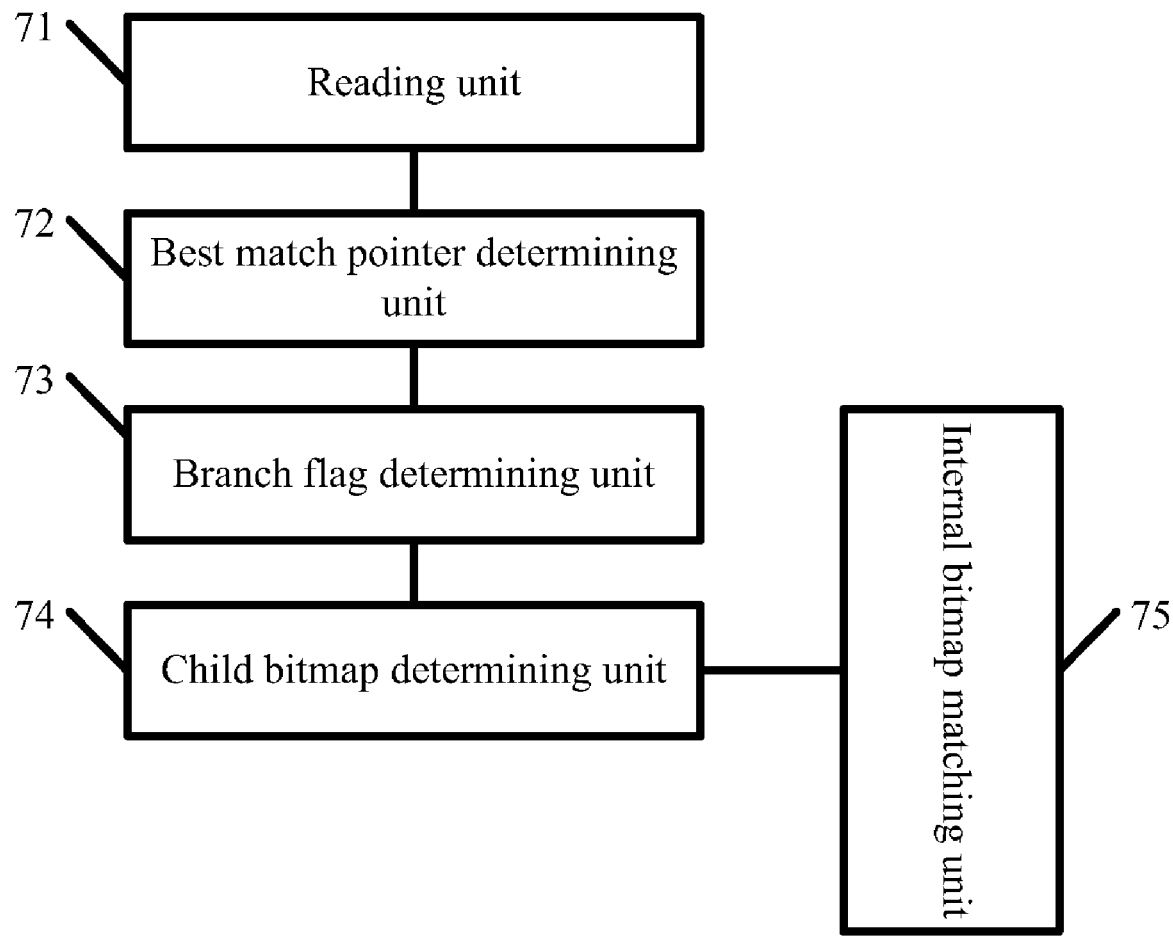
FIG. 7 shows a search apparatus in an embodiment of the present invention.

FIG. 7 shows a search apparatus for searching for a longest matched prefix based on a trie according to an embodiment of the present invention, where the trie represents multiple prefixes, with a prefix distinguished by at least one step and each step indicated by one node, and nodes are read from at least one memory.

The search apparatus includes:

a reading unit 71, adapted to read a node in the trie;

a best match pointer determining unit 72, adapted to determine whether an offset field of the read node indicates that a matched prefix exists in an upper level node and, if a matched prefix exists, add the offset of the node to a pointer that points to a leaf array in the upper level node and update a current best match pointer;

a branch flag determining unit 73, adapted to determine whether a branch flag of the node matches the corresponding bit of the search keyword and, when they match, trigger a child bitmap determining unit 74;

a child bitmap determining unit 74, adapted to determine whether the node has a child node according to a child bitmap and, if no child node exists, trigger an internal bitmap matching unit 75; and an internal bitmap matching unit 75, adapted to read the internal bitmap of the node, compute a longest matched prefix in the node according to the internal bitmap and a pointer that points to a leaf array in the node, update the current best match pointer with the computation result, and compute the address of a LNODE associated with the current best match pointer.

In the embodiment, the best match pointer determining unit 72 determines the current best match pointer; the branch flag determining unit 73 determines whether the branch flag of a node matches the corresponding bit of the search keyword and if they match, triggers the child bitmap determining unit 74; the child bitmap determining unit 74 determines whether the node has a child node and if no child node exists, triggers the internal bitmap matching unit 75; the internal bitmap matching unit 75 computes the longest matched prefix in the TNODE according to the internal bitmap and a pointer that points to a leaf array in the TNODE, updates the current best match pointer with the computation result, and computes the address of a LNODE associated with the current best match pointer. For the step size of the read node being r bits, with the search apparatus in the embodiment of the present invention, r+1 bits of the search keyword can be processed at a time, so the search is faster.

The preceding embodiment of the present invention may be further optimized, as detailed in the following embodiments.

Figure 8:
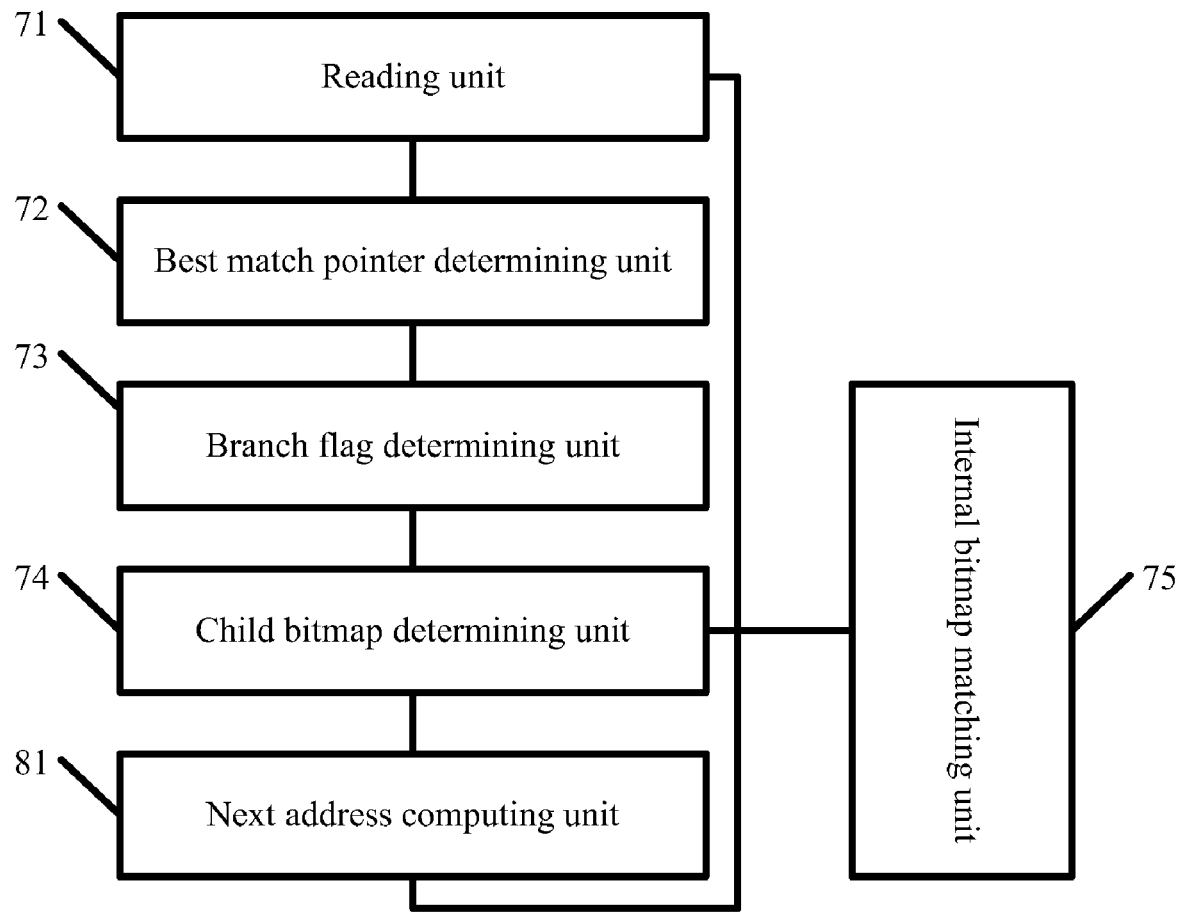
FIG. 8 shows a search apparatus in another embodiment of the present invention.

FIG. 8 shows a search apparatus according to another embodiment of the present invention, wherein the child bitmap determining unit is further adapted to trigger a next node address computing unit 81 when the current node has a child node.

The next node address computing unit 81 is adapted to determine the number of branches of the current node according to the type bitmap of the node when the child bitmap determining unit 74 determines that the current node has a child node, compute the address of the next node to be read according to the child bitmap, type bitmap, a pointer pointing to a leaf array in the node and the corresponding bit of the search keyword, and trigger the reading unit 71 to read the node for searching.

The search apparatus can search for a longest matched prefix by searching a node that has a child node.

In the preceding embodiment of the present invention, to increase the search speed, multiple memories may be set so that one memory stores one level of nodes.

Moreover, the internal bitmap of the node acts as an independent INODE and is stored with the child array of the node in succession. Thus, if there is a lower level node matching the search keyword, it is unnecessary to read the INODE, so that only one memory is read at a time. The search speed is further improved.

The previous embodiment may be further optimized as described in the following embodiment.

Figure 9:
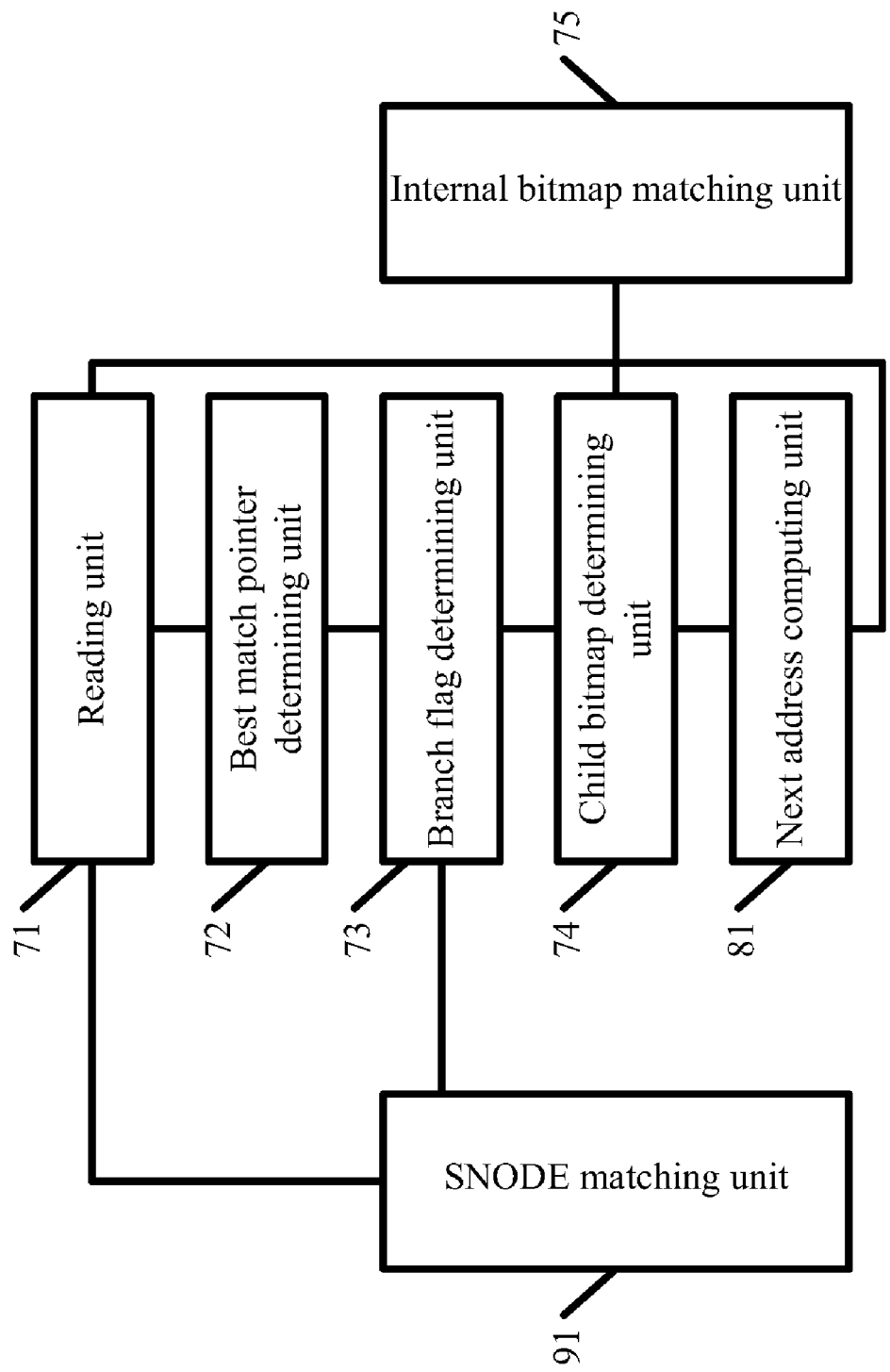
FIG. 9 shows a search apparatus in a third embodiment of the present invention.

FIG. 9 shows a search apparatus according to a third embodiment of the present invention. Based on the first embodiment, the search apparatus further includes a SNODE matching unit 91, adapted to determine whether the comparison data of the read SNODE equals the corresponding bits of the search keyword when the branch flag determining unit 73 determines that the branch flag of the read SNODE matches the corresponding bit of the search keyword, and when they are equal, compute the address of the next node to be read according the pointer that points to a child array in the SNODE and trigger the reading unit 71 to read the next node so that the search continues.

In the search apparatus, when continuous uni-branch paths appear in a trie, the SNODE matching unit determines whether the continuous uni-branch paths match the corresponding bit of the search keyword, and thus multiple nodes can be read at a time, so the search is even faster.

Figure 10:
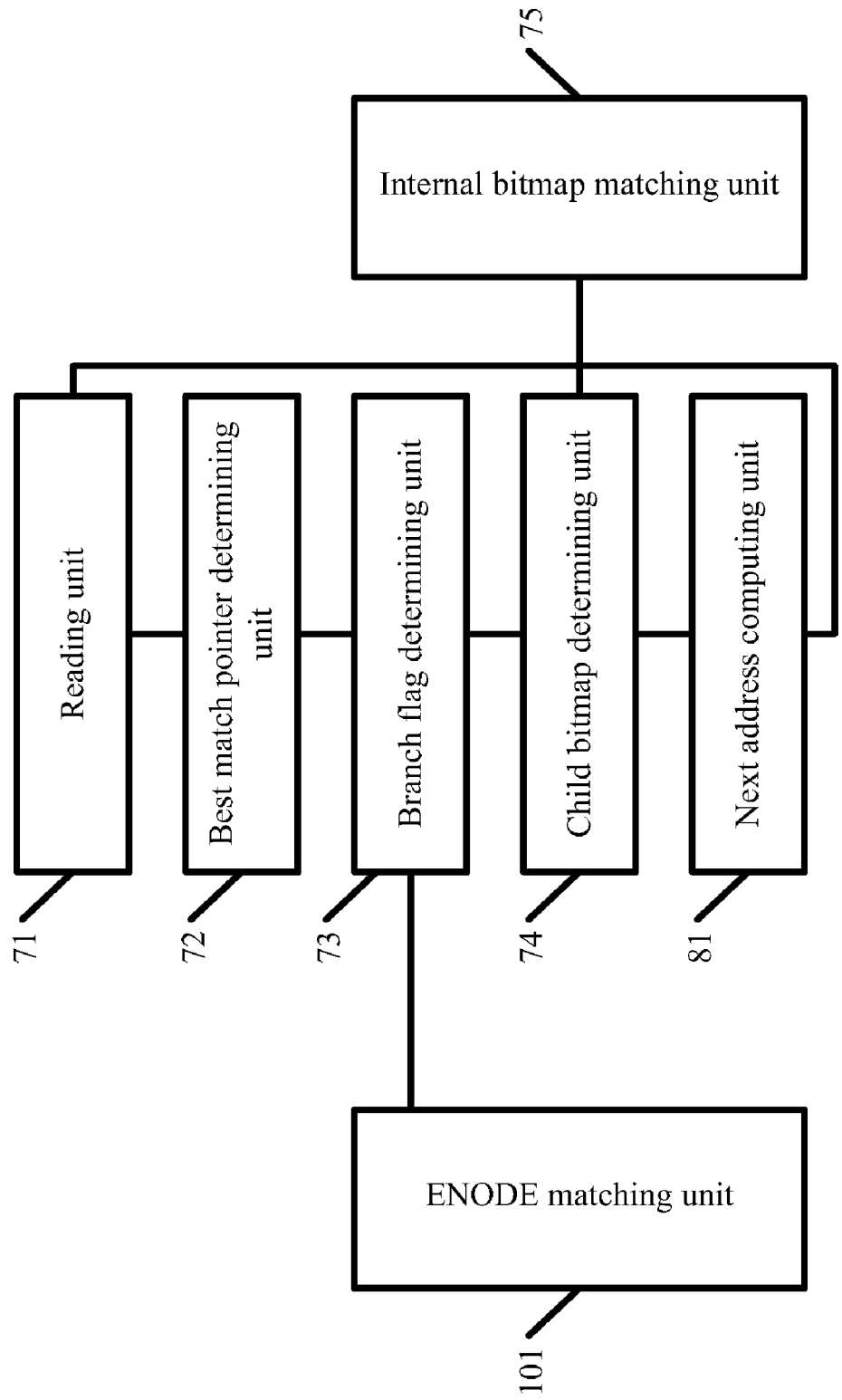
FIG. 10 shows a search apparatus in a fourth embodiment of the present invention.

The search apparatus in the second and third embodiments of the present invention may further include an ENODE matching unit. For description purposes, the following description is based on the search apparatus in the first embodiment. As shown in FIG. 10, on the basis of the first embodiment, a search apparatus according to a fourth embodiment of the present invention further includes an ENODE matching unit 101. The ENODE matching unit 101 is adapted to compute the longest prefix in the ENODE that matches the search keyword according to the internal bitmap of the ENODE and a pointer that points to a leaf array in the ENODE when the branch flag determining unit 73 determines that the branch flag of the ENODE matches the corresponding bit of the search keyword, update the current best match pointer with the computation result, and compute the address of a LNODE associated with the current best match pointer.

The search apparatus determines whether a longest matched prefix exists in an ENODE via the ENODE matching unit. Because the ENODE has no child node, it is unnecessary to store the child bitmap and type bitmap of the node in the node. Instead, the internal bitmap is stored in the node so that one memory read is spared and the search is faster.

Figure 11:
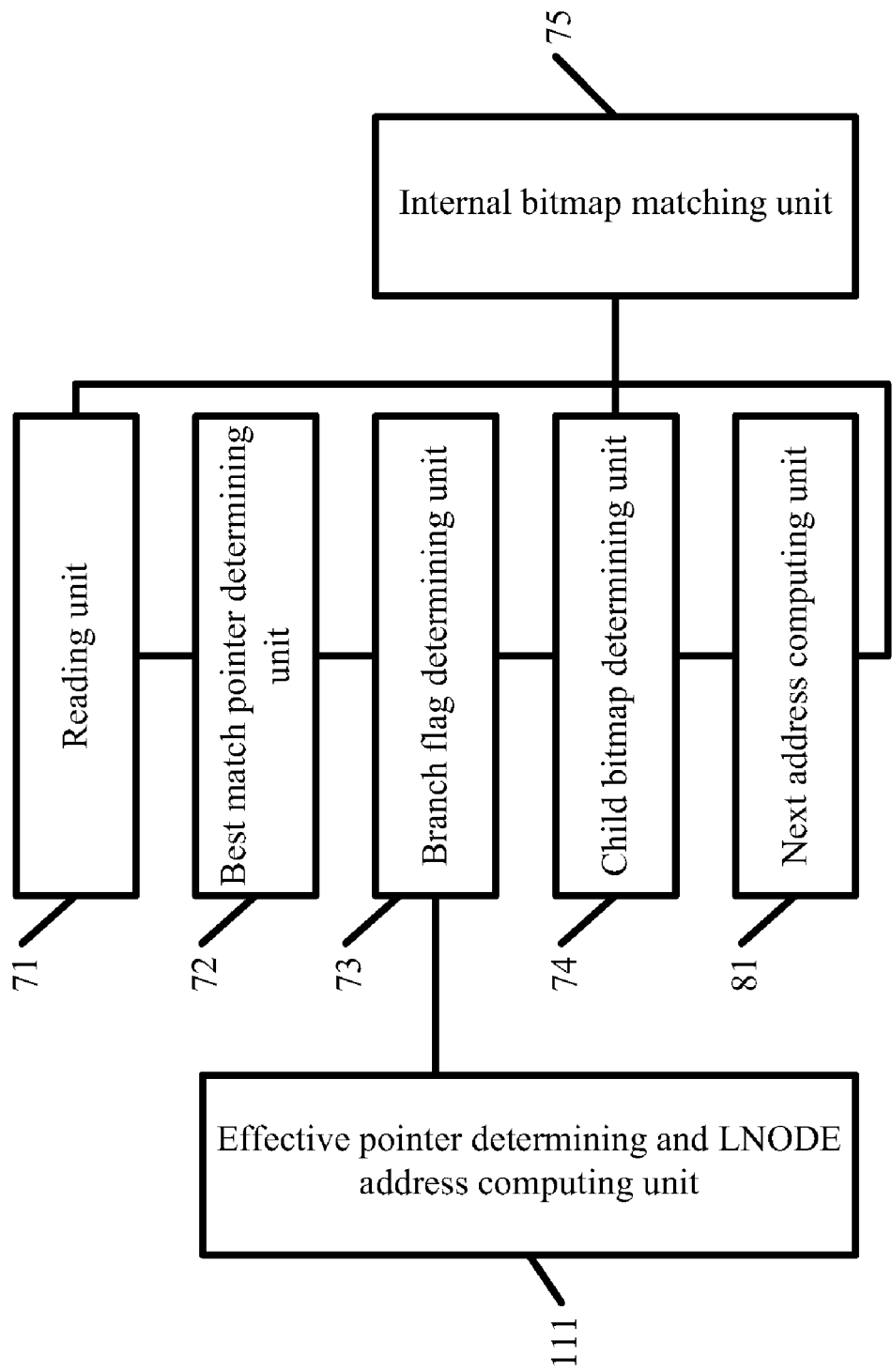
FIG. 11 shows a search apparatus in a fifth embodiment of the present invention.

The above search apparatus may be further optimized. As shown in FIG. 11, a search apparatus according to a fifth embodiment of the present invention, based on the first embodiment, further includes an effective pointer determining and LNODE address computing unit 111. The effective pointer determining and LNODE address computing unit 111 is adapted to determine whether the current best match pointer is effective when the branch flag determining unit 73 determines that the branch flag of the current node does not match the corresponding bit of the search keyword, and when the current best match pointer is effective, compute the address of a LNODE associated with the current best match pointer.

In this embodiment of the present invention, the effective pointer determining and LNODE address computing unit computes the address of the associated LNODE according to the current best match pointer when the current best match pointer is effective. Even if the branch flag of the read node does not match the corresponding bit of the search keyword, which means the search is along a wrong path, the correct LNODE address is still assured.

The search apparatus in the embodiment of the present invention is applicable in multiple fields. For example, it may be applied in computer and communication technologies. The following details a search apparatus applied in the communication field.

Figure 12:
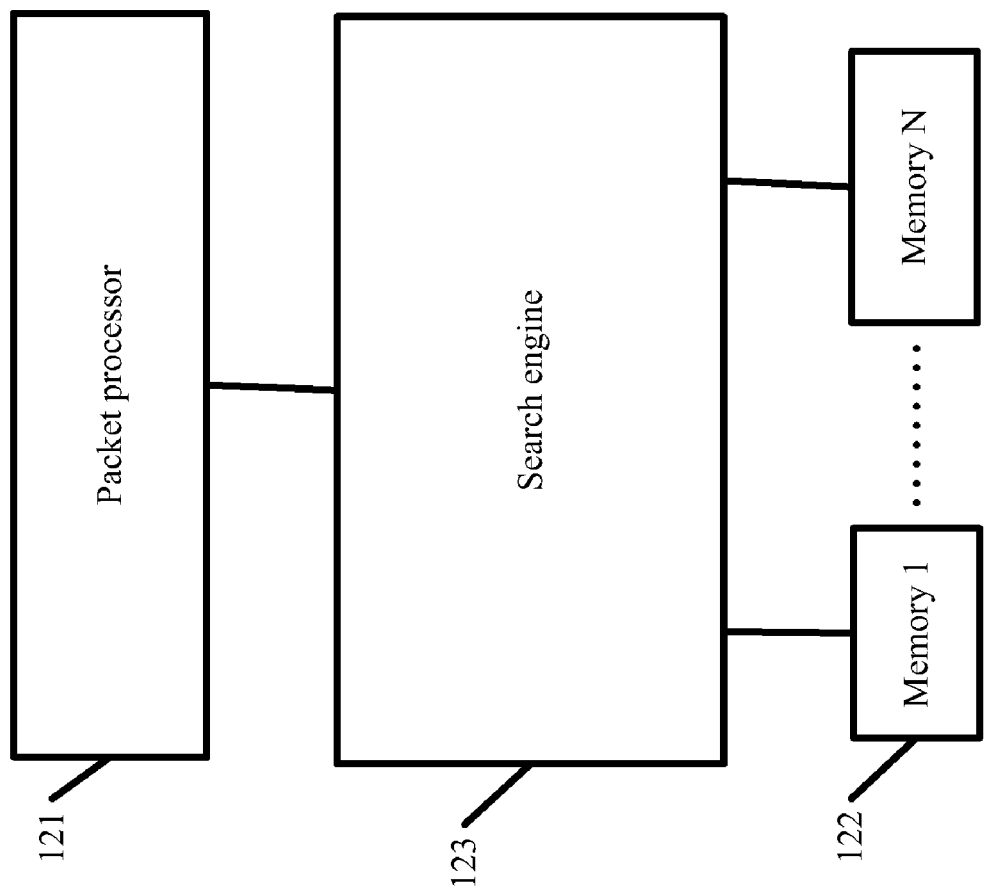
FIG. 12 shows a router in an embodiment of the present invention.

As shown in FIG. 12, a router in an embodiment of the present invention includes a packet processor 121, adapted to send search requests and receive search results from a search engine, and at least one memory 122, adapted to store nodes in a trie, which represents multiple prefixes, with a prefix distinguished by at least one step and each step indicated by one node.

The router also includes a search engine 123, adapted to read a node from the memory 122 when receiving a search request from the packet processor 121, determine whether an offset field of the read node indicates that a matched prefix exists in the upper level node and, if a matched prefix exists, add the offset of the node to a pointer that points to a leaf array in the upper level node and update the current best match pointer; determine whether the branch flag of the node matches the corresponding bit of the search keyword and, if they match, determine whether the node has a child node according to the child bitmap and, if no child node exists, read the internal bitmap of the node, compute a longest matched prefix in the node according to the internal bitmap and a pointer that points to a leaf array in the node, update the current best match pointer with the computation result, compute an address of a LNODE associated with the current best match pointer, and send the computation result to the packet processor 121.

In the router, the search engine 123 determines the current best match pointer, determines whether the branch flag of the node matches the corresponding bit of the search keyword, and when they match, determines whether the node has a child node, and when the node has no child node, computes the longest matched prefix in the TNODE according to the internal bitmap and a pointer pointing to a leaf array in the TNODE, updates the current best match pointer with the computation result and computes the address of a LNODE associated with the current beset match pointer. For the step size of the read node being r bits, with the router according to the embodiment of the present invention, r+1 bits of the search keyword can be processed at a time, so the search is faster.

The preceding router may be further optimized.

For example, the search engine 123 may be further adapted to determine the number of branches of the node according to the type bitmap of the node when it is determined the node has a child node, and compute the address of the next node to be read according to the child bitmap, type bitmap and a pointer pointing to a leaf array in the node as well as the corresponding bit of the search keyword, and read the next node from the memory for searching.

Thus, the router can search for a longest matched prefix by searching a node that has a child node.

The search engine 123 may also be adapted to determine whether the comparison data of the read SNODE equals the corresponding bits of the search keyword when it is determined that the branch flag of the read SNODE matches the corresponding bit of the search keyword, and if they are equal, compute the address of the next node to be read according to a pointer pointing to a child array in the SNODE, and read the next node so that the search continues.

When continuous uni-branch paths appear in a trie, the search engine determines whether the continuous uni-branch paths match the corresponding bit of the search keyword, and thus multiple nodes can be read at a time, so the search is even faster.

The search engine 123 may also be adapted to compute the longest prefix in the ENODE that matches the search keyword according to the internal bitmap of the ENODE and a pointer that points to a leaf array in the ENODE when it is determined that the branch flag of the read ENODE matches the corresponding bit of the search keyword, update the current best match pointer with the computation result, and compute the address of a LNODE associated with the current best match pointer.

The search engine determines whether a longest matched prefix exists in an ENODE. Because the ENODE has no child node, it is unnecessary to store the child bitmap and type bitmap of the node in the node. Instead, the internal bitmap is stored in the node, so one memory read is spared and the search is faster.

The search engine 123 may also be adapted to determine whether the current best match pointer is effective when it is determined that the branch flag of the read node does not match the corresponding bit of the search keyword, and if the current best match pointer is effective, compute the address of a LNODE associated with the current best match pointer.

So, even if the branch flag of the read node does not match the corresponding bit of the search keyword, which means the search is along a wrong path, the correct address of the read LNODE is assured.

It is understandable that the router in the preceding embodiment of the present invention may further include a maintenance processor, adapted to send instructions to the search engine.

The search engine is further adapted to read or write a memory according to an instruction of the maintenance processor and send the execution result back to the maintenance processor.

In the router according to the preceding embodiment of the present invention, the memory may be a SRAM or a DRAM, which may be selected according to actual needs. In addition, to further increase the search speed, there may be multiple memories, each to store one level of nodes.

Moreover, the internal bitmap of the node is stored in succession with the child array of the node as an independent INODE. Thus, if there is a matched lower level node, it is unnecessary to read the INODE. If there is no matched lower level node, the internal bitmap is read. In this way, it is assured that only one memory is read at a time, so the search is even faster.

Those skilled in the art should understand that part or all steps in the method in the preceding embodiments may be implemented by related hardware instructed by a program. The program may be stored in a readable storage medium in a computer.

The execution of the program includes the following steps:

(A) reading a current-level TNODE in the trie;

(B) determining whether the offset field of the read TNODE indicates that a matched prefix exists in the upper level node and, if a matched prefix exists, add the offset field of the TNODE to a pointer that points to a leaf array in the upper level node, update the current best match pointer and execute step (C); or, if no matched prefix exists, execute step (C) directly;

(C) determining whether the TNODE has a child node according to a child bitmap when it is determined that the branch flag of the TNODE matches the corresponding bit of the search keyword; and (D) when it is determined that the TNODE has no child node, read the internal bitmap of the TNODE, compute the longest matched prefix in the TNODE according to the internal bitmap and a pointer that points to a leaf array in the TNODE, update the current best match pointer with the computation result, and compute the address of a LNODE associated with the current best match pointer.

The storage medium may be a read-only memory, a magnetic disk or a compact disk.

In the technical scheme of the embodiments, the offset field of a read TNODE indicates whether a matched prefix exists in an upper level node, and when a matched prefix exists, the offset of the current TNODE is added to a pointer that points to a child array in the upper level node and the current best match pointer is updated. When the branch flag of the TNODE matches a corresponding bit of the search keyword, and when it is determined that the TNODE has no child node according to a child bitmap, a longest matched prefix in the node can be computed according to an internal bitmap of the TNODE, a pointer that points to a child array and a corresponding bit of the search keyword. The computation result is used to update the current best match pointer and the address of a LNODE associated with the current best match pointer is computed. In the embodiment, the step size of the TNODE is assumed to be r bits. According to the branch flag of an upper level node, it can be determined whether the path of the TNODE that extends to the upper level node matches 1 bit of the search keyword. Moreover, the internal bitmap of the read TNODE corresponds to the next r bits of the search keyword. Therefore, when one node is read, r+1 bits of the search keyword can be processed. The search is faster than longest prefix matching based on a multi-bit trie or compressed multi-bit trie where only r bits of the search keyword can be processed when one node with a step size of r bits is read.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for longest prefix matching based on a trie, wherein the trie represents multiple prefixes with a prefix distinguished by at least one step and each step indicated by one node, the method comprising the steps of:
    (A) reading a current-level trie node (TNODE) from a memory in the trie by a search engine;
    (B) determining whether an offset field of the TNODE indicates that a matched prefix exists in an upper level node by the search engine, if a matched prefix exists in the upper level node, adding the offset field of the TNODE to a pointer that points to a leaf array in the upper level node, updating a current best match pointer with the computation result and executing step (C); or, if no matched prefix exists in the upper level node, executing step (C);
    (C) determining whether the TNODE has a child node according to a child bitmap, when a branch flag of the TNODE matches a corresponding bit of a search keyword, by the search engine; and
    (D) when the TNODE has no child node, reading an internal bitmap of the TNODE, computing a longest matched prefix in the TNODE according to the internal bitmap and a pointer that points to a leaf array in the TNODE, updating the current best match pointer with the computation result, and computing an address of a leaf node (LNODE) associated with the current best match pointer by the search engine.

2. The method of claim 1, further comprising the step of: when the TNODE has a child node, determining the number of branches of the current node according to a type bitmap of the node, and computing an address of a next node to be read according to the child bitmap, the type bitmap, a pointer pointing to a child array in the TNODE and the corresponding bit of the search keyword, and turning to step (A), by the search engine.

3. The method of claim 2, further comprising the step of: reading a skip node (SNODE), wherein the SNODE represents a continuous uni-branch path; and wherein when a branch flag of the read SNODE matches a corresponding bit of the search keyword and the comparison data of the read SNODE equals corresponding bits of the search keyword, computing an address of a next node to be read according to a pointer pointing to a child array in the SNODE, and reading the next node so that the search continues, by the search engine.

4. The method of claim 2, further comprising the step of: reading an end node (ENODE); and wherein when a branch flag of the read ENODE matches a corresponding bit of the search keyword, computing a longest prefix in the ENODE that matches the search keyword according to an internal bitmap of the ENODE and a pointer that points to a leaf array in the ENODE, updating the current best match pointer with the computation result, and computing an address of a leaf node (LNODE) associated with the current best match pointer, by the search engine.

5. The method of claim 1, wherein the internal bitmap of the TNODE is stored in succession with the child array of the current node as an independent node.

6. The method of claim 1, further comprising the step of: when the branch flag of the TNODE does not match the corresponding bit of the search keyword, determining whether the current best match pointer is effective, and if the current best match pointer is effective, computing an address of a LNODE associated with the current best match pointer, by the search engine.

7. A search apparatus for searching for a longest matched prefix based on a trie, wherein the trie represents multiple prefixes, with a prefix distinguished by at least one step and each step indicated by one node, and nodes are read from at least one memory, the apparatus comprising:
    (a) a reading unit, configured to read a node in the trie;
    (b) a best match pointer determining unit, configured to determine whether an offset field of the node indicates that a matched prefix exists in an upper level node and, if a matched prefix exists in the upper level node, add the offset field of the node to a pointer that points to a leaf array in the upper level node and update a current best match pointer with the computation result;
    (c) a branch flag determining unit, configured to determine whether a branch flag of the node matches a corresponding bit of a search keyword and, if the branch flag of the node matches the corresponding bit of the search keyword, trigger a child bitmap determining unit;
    (d) a child bitmap determining unit, configured to determine whether the node has a child node according to a child bitmap and, if no child node exists, trigger an internal bitmap matching unit; and
    (e) an internal bitmap matching unit, configured to read an internal bitmap of the node, compute a longest matched prefix in the node according to the internal bitmap and a pointer that points to a leaf array in the node, update the current best match pointer with the computation result, and compute an address of a leaf node (LNODE) associated with the current best match pointer.

8. The search apparatus of claim 7, further comprising a next node address computing unit, configured to determine the number of branches of the current node according to a type bitmap of the node when the child bitmap determining unit determines that the current node has a child node, compute the address of a next node to be read according to the child bitmap, the type bitmap, a pointer pointing to a child array in the node and the corresponding bit of the search keyword, and trigger the reading unit to read a node for searching.

9. The search apparatus of claim 8, wherein each memory is configured to store nodes of one level.

10. The search apparatus of claim 8, wherein the internal bitmap of the node is stored in succession with a child array of the node as an independent internal node (INODE).

11. The search apparatus of claim 8, further comprising a skip node (SNODE) matching unit, configured to determine whether comparison data of the read SNODE equals corresponding bits of the search keyword when the branch flag determining unit determines that the branch flag of the SNODE matches the corresponding bit of the search keyword, and when the comparison data of the read SNODE equals the corresponding bits of the search keyword, compute an address of a next node to be read according a pointer that points to a child array in the SNODE and trigger the reading unit to read the next node so that the search continues.

12. The search apparatus of claim 8, further comprising an end node (ENODE) matching unit, configured to compute a longest prefix in the ENODE that matches the search keyword according to an internal bitmap of the ENODE and a pointer that points to a leaf array in the ENODE when the branch flag determining unit determines that a branch flag of the ENODE matches a corresponding bit of the search keyword, update a current best match pointer with the computation result, and compute an address of a leaf node (LNODE) associated with the current best match pointer.

13. The search apparatus of claim 7, further comprising an effective pointer determining and LNODE address computing unit, configured to determine whether the current best match pointer is effective when the branch flag determining unit determines that the branch flag of the read node does not match a corresponding bit of the search keyword, and when the current best match pointer is effective, compute an address of an associated LNODE according to the current best match pointer.

14. A computer-readable storage medium containing a program for performing a method for longest prefix matching based on a trie, wherein the trie represents multiple prefixes with a prefix distinguished by at least one step and each step indicated by one node, the execution of the program by a computer comprising the steps of:

(A) reading a current-level trie node (TNODE) in the trie;
(B) determining whether an offset field of the TNODE indicates that a matched prefix exists in an upper level node and, if a matched prefix exists in the upper level node, adding the offset field of the TNODE to a pointer that points to a leaf array in the upper level node, updating a current best match pointer with the computation result and executing step (C); or, if no matched prefix exists in the upper level node, executing step (C);
(C) determining whether the TNODE has a child node according to a child bitmap, when a branch flag of the TNODE matches a corresponding bit of a search keyword; and
(D) when the TNODE has no child node, reading an internal bitmap of the TNODE, computing a longest matched prefix in the TNODE according to the internal bitmap and a pointer that points to a leaf array in the TNODE, updating the current best match pointer with the computation result, and computing an address of a leaf node (LNODE) associated with the current best match pointer.

15. The computer-readable storage medium of claim 14, further comprising the steps of:
when the TNODE has a child node, determining the number of branches of the current node according to a type bitmap of the node, and computing an address of a next node to be read according to the child bitmap, the type bitmap, a pointer pointing to a child array in the TNODE and the corresponding bit of the search keyword, and turning to step (A).

* * * * *